(12) United States Patent
Nagano

(10) Patent No.: US 7,833,652 B2
(45) Date of Patent: Nov. 16, 2010

(54) BATTERY LOADING MECHANISM AND ELECTRONIC APPARATUS

(75) Inventor: Kouta Nagano, Osaka (JP)

(73) Assignee: Sony Corporation, Tokyo (JP)

( * ) Notice: Subject to any disclaimer, the term of this patent is extended or adjusted under 35 U.S.C. 154(b) by 1014 days.

(21) Appl. No.: 11/511,405

(22) Filed: Aug. 29, 2006

(65) Prior Publication Data
US 2007/0054181 A1 Mar. 8, 2007

(30) Foreign Application Priority Data
Aug. 29, 2005 (JP) ............................. 2005-247961

(51) Int. Cl.
*H01M 2/10* (2006.01)
(52) U.S. Cl. ........................................ 429/97; 429/123
(58) Field of Classification Search ........... 429/96–100, 429/123
See application file for complete search history.

(56) References Cited

U.S. PATENT DOCUMENTS 6,589,688 B2 * 7/2003 Jørgensen et al. ............. 429/96
2002/0022176 A1 * 2/2002 Aw et al. ..................... 429/100
2003/0096159 A1 * 5/2003 Suzuki ......................... 429/96

FOREIGN PATENT DOCUMENTS

JP 05-087812 4/1993
JP 2005-174919 6/2005

* cited by examiner

*Primary Examiner*—Stuart Hendrickson
*Assistant Examiner*—Richard M Rump
(74) *Attorney, Agent, or Firm*—Finnegan, Henderson, Farabow, Garrett & Dunner, L.L.P.

(57) ABSTRACT

A battery loading mechanism includes: a battery loading section having an insertion space capable for accommodating a battery, in which a portion of an outer circumference of each of two end surfaces on insertion and ejection sides, respectively, is formed as a curve section; and lock means for locking the battery loaded into the battery loading section, the lock means rotatably supported on the battery loading section. The lock means includes a lock section, the lock section being formed in such a shape that it becomes wider the further away it is from a point at which the lock means is rotatably supported, and at least a portion of a side edge of the lock section in a width direction is formed as a curve section corresponding to the curve section of the battery.

15 Claims, 38 Drawing Sheets

BATTERY LOADING MECHANISM AND ELECTRONIC APPARATUS

BACKGROUND OF THE INVENTION

1. Field of the Invention

The present invention relates to a technical field regarding battery loading mechanisms and electronic apparatuses. More specifically, the present invention relates to a technical field seeking to improve, by improving the shape of a lock section of lock means that locks a battery, the holding strength when the battery is locked.

2. Description of Related Art

Electronic apparatuses include various apparatuses such as, for example, video cameras, still cameras, television receivers, mobile phones, audio apparatuses and the like, and such apparatuses can sometimes be powered by batteries.

Electronic apparatuses that run on batteries are provided with a battery loading section (battery accommodating section) into which a battery is housed and loaded. See, for example, Japanese Patent Application Publication No. 2005-174919. When a battery is inserted into the battery loading section, the battery is locked in the battery loading section by lock means, connective terminals of the battery are connected with terminal sections provided on the battery loading section, and battery power thus becomes available.

SUMMARY OF THE INVENTION

There exist a variety of such lock means that hold a battery in a battery loading section.

For example, in the case of lock means that are supported so as to be rotatable in relation to a battery loading section, the following may be considered (see FIG. 37).

An insertion space b into which a battery x may be inserted is formed in a battery loading section a. The battery x is formed approximately in the shape of an elliptical cylinder cut in half along its wider diameter. Parts of the outer perimeter of each end surface, which faces the insertion direction or the ejection direction, are formed as curve sections y, y . . . and parts between the curve sections y, y . . . are formed as linear sections z, z.

As described above, by forming the battery x approximately in a flat block shape with only two out of four longer-side edges being rounded off, instead of a rectangular shape, it is possible to prevent the battery x from being incorrectly oriented when being inserted into the insertion space b.

Lock means c is rotatably supported on the battery loading section a, and the lock means c includes a spindle section d that serves as the fulcrum, and a lock section e that is provided on one end of the shaft of the spindle section d. The lock section e is formed in the shape of a rectangle.

As indicated with the chained line in FIG. 38, when the battery x is in the middle of being inserted into the insertion space b of the battery loading section a, the lock section e is so positioned to be parallel to the linear section z in close proximity to the curve section y of the battery x.

Once the battery x is inserted into the insertion space b of the battery loading section a, the lock section e is rotated in direction S1 indicated in FIG. 38 by a bias spring, which is not shown in drawing, the end surface of the battery x on the ejection side is pressed by a portion of the lock section e, and the battery x is locked in the battery loading section a by the lock means c.

However, when the battery x is locked in this manner by rotating the lock section e, there arises a problem in that the holding strength of the lock means c is small due to the fact that the contact area (the shaded area S indicated in FIG. 38) between the lock section e and the battery x, in other words, the area by which the lock section e presses the battery x, is smaller since the curve section y is formed on the battery x.

In order to avoid this problem, making the lock section e bigger may be considered, however, in such a case, the placement space for the lock section e becomes bigger, thereby causing the electronic apparatus to become larger.

Alternatively, increasing the extent of rotation by the lock section e in direction R1 may be considered in order to increase the contact area between the lock section e and the battery x, however, in this case, it becomes necessary to increase the force of the bias spring that biases the lock section e in direction R1, which causes an increase in cost.

As such, the present invention seeks to overcome the problems mentioned above, and seeks to improve the holding strength when the battery is in a locked state.

In order to address the problems above, a battery loading mechanism according to an embodiment of the present invention includes a battery loading section that has an insertion space into which a battery, which has a portion of a perimeter of each of two end surfaces on the insertion side and ejection side formed as a curve section, is inserted, and lock means which locks the battery that is loaded into the battery loading section and which is rotatably supported on the battery loading section.

The lock means may include a spindle section which extends in the insertion direction of the battery with respect to the battery loading section and which serves as the rotational fulcrum, and a lock section which protrudes from the spindle section and which rotates in the direction in which the shaft of the spindle section rotates.

The lock section may be formed in such a shape that it becomes wider the further away it is from the spindle section in the direction in which it protrudes from the spindle section. At least a portion of a side edge of the lock section in its width direction is formed as a curve section corresponding to the curve section of the battery. An opening rim on the entrance side of the insertion space of the battery loading section is formed in a shape that accommodates the end surfaces of the battery on its insertion and ejection sides.

When the battery is being inserted into the insertion space, the curve section of the side edge of the lock section is so placed to be in alignment with the portion of the above-mentioned opening rim of the battery loading section formed in the shape of a curve, and once the insertion of the battery into the battery loading section is completed, the lock section is rotated and comes into contact with the end surface of the battery on the ejection side, thereby locking the battery in the battery loading section.

In order to address the problems above, an electronic apparatus according to an embodiment of the present invention includes a battery loading section that has an insertion space into which a battery is inserted, and lock means which locks the battery that is loaded into the battery loading section and which is rotatably supported on the battery loading section.

The lock means may include a spindle section which extends in the insertion direction of the battery with respect to the battery loading section and which serves as the rotational fulcrum, and a lock section which protrudes from the spindle section and which rotates in the direction in which the shaft of the spindle section rotates.

The lock section may be formed in such a shape that it becomes wider the further away it is from the spindle section in the direction in which it protrudes from the spindle section. At least a portion of a side edge of the lock section in its width direction is formed as a curve section corresponding to the curve section of the battery. An opening rim on the entrance side of the insertion space of the battery loading section is formed in a shape that accommodates the end surfaces of the battery on its insertion and ejection sides.

When the battery is being inserted into the insertion space, the curve section of the side edge of the lock section is so placed to be in alignment with the portion of the above-mentioned opening rim of the battery loading section formed in the shape of a curve, and once the insertion of the battery into the battery loading section is completed, the lock section is rotated and comes into contact with the end surface of the battery on the ejection side, thereby locking the battery in the battery loading section.

Therefore, with a battery loading mechanism and electronic apparatus of the present invention, the contact area between the lock section and the battery is larger, and the locked state of the battery can thus be stabilized.

In an embodiment of the present invention, a slope section, whose thickness decreases the closer it is to the curve section of the lock section, may be formed on a surface of the above-mentioned lock section, thereby making it possible to rotate the lock section by pressing the battery against the slope section, and making the insertion of the battery into the insertion space easier.

BRIEF DESCRIPTION OF THE DRAWINGS

The present invention will become more readily appreciated and understood from the following detailed description of embodiments and examples of the present invention when taken in conjunction with the accompanying drawings, in which:

FIG. 17 is an enlarged sectional view indicating an arrangement of the touch panel, the liquid crystal panel, the back light panel, and the like;

FIG. 18 is an enlarged sectional view indicating another example of an arrangement of the touch panel, the liquid crystal panel, the back light panel, and the like;

DETAILED DESCRIPTION OF THE EMBODIMENTS

Figure 1:
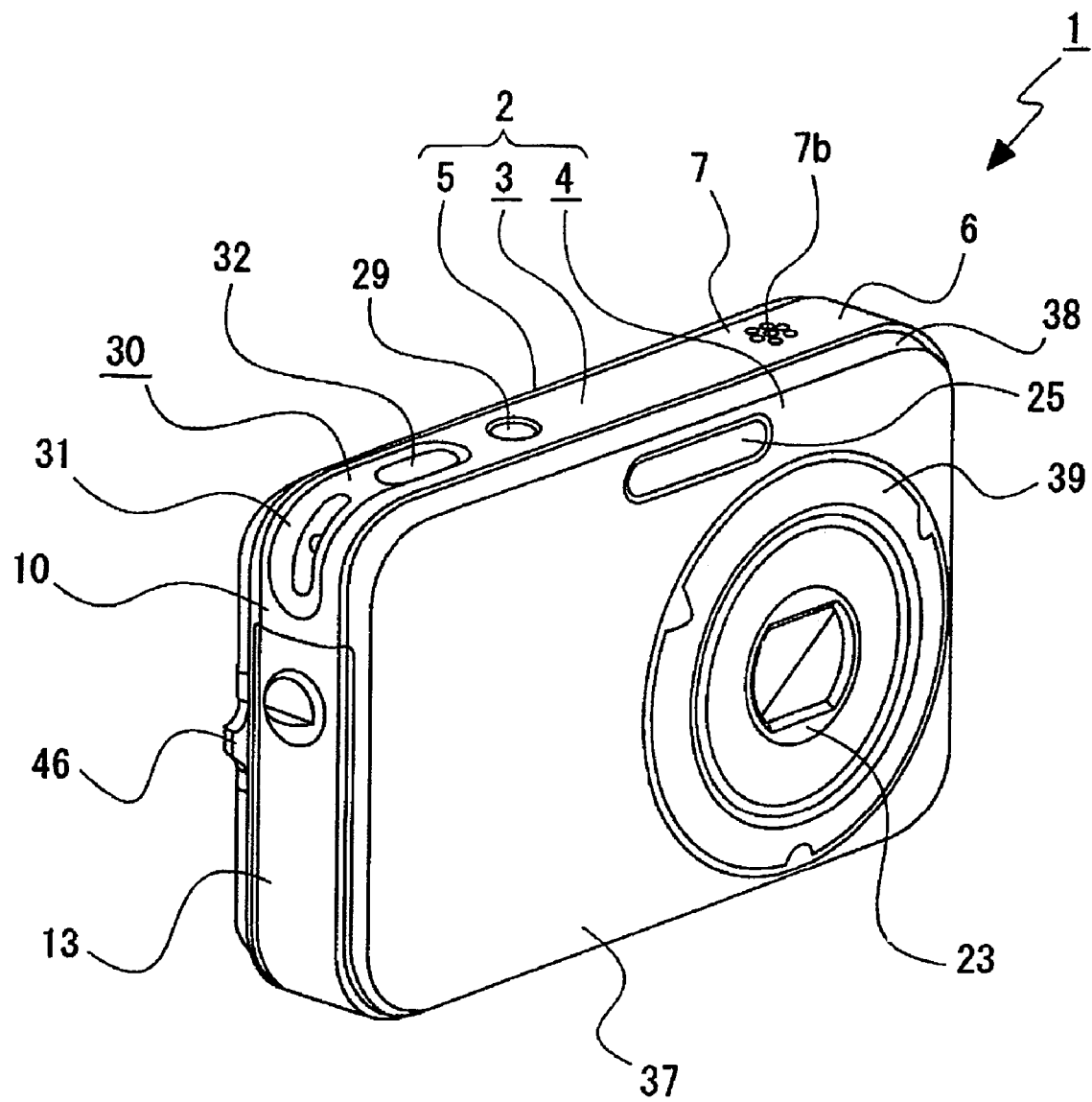
FIG. 1, together with FIGS. 2 through 36, indicates an embodiment of the present invention, and is a perspective view of a still camera as an example of an electronic apparatus.

Embodiments of the present invention will be described below in accordance with the appended drawings.

The embodiment indicated below is one in which the present invention is applied to a still camera.

It is to be noted that the application of the present invention is by no means limited to still cameras, and may instead be widely applied to various electronic apparatuses such as, for example, video cameras, television receivers, mobile phones, personal computers, PDAs (Personal Digital Assistants), network terminals, portable information terminals, work stations, audio apparatuses and the like.

In the description below, directions such as front, rear, up, down, left and right will be referred to as seen by the photographer using a still camera. Therefore, the subject's side will be the front, while the photographer's side will be referred to as the rear.

It is to be noted that these directional terms used below are used only for the purpose of convenience and clarity of explanation, and the implementation of the present invention should not be limited in any way as a result of the use of these directional terms.

An electronic apparatus 1 includes various components arranged within an outer casing 2. The outer casing 2, for example, may be shaped in a wide and flat form (see FIG. 1 and FIG. 2). The outer casing 2 includes three components, a middle frame 3, a front panel 4 joined with the front surface of the middle frame 3, and a rear panel 5 joined with the rear surface of the middle frame 3.

Figure 3:
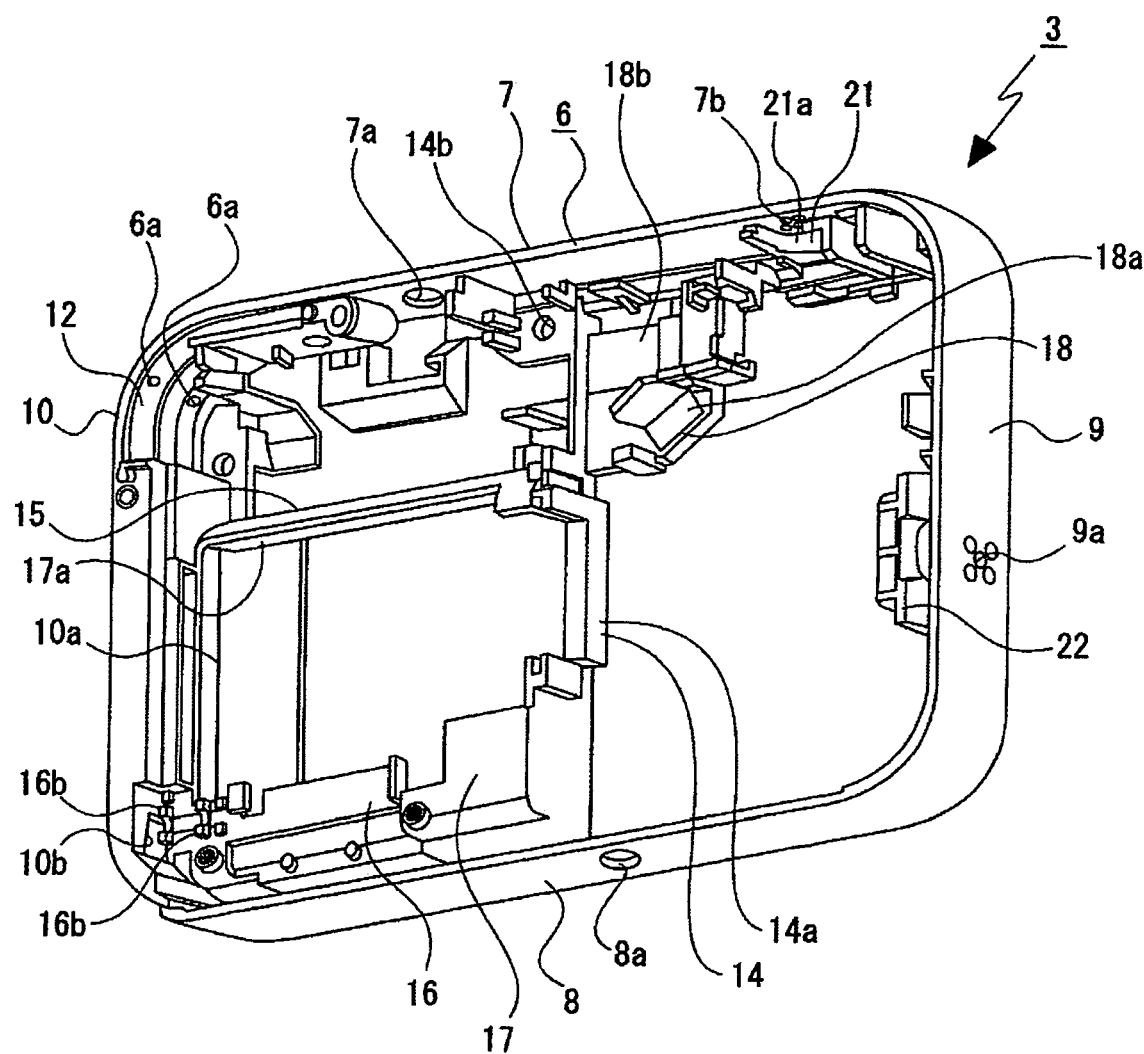
FIG. 3 is an enlarged perspective view of a middle frame.
Figure 4:
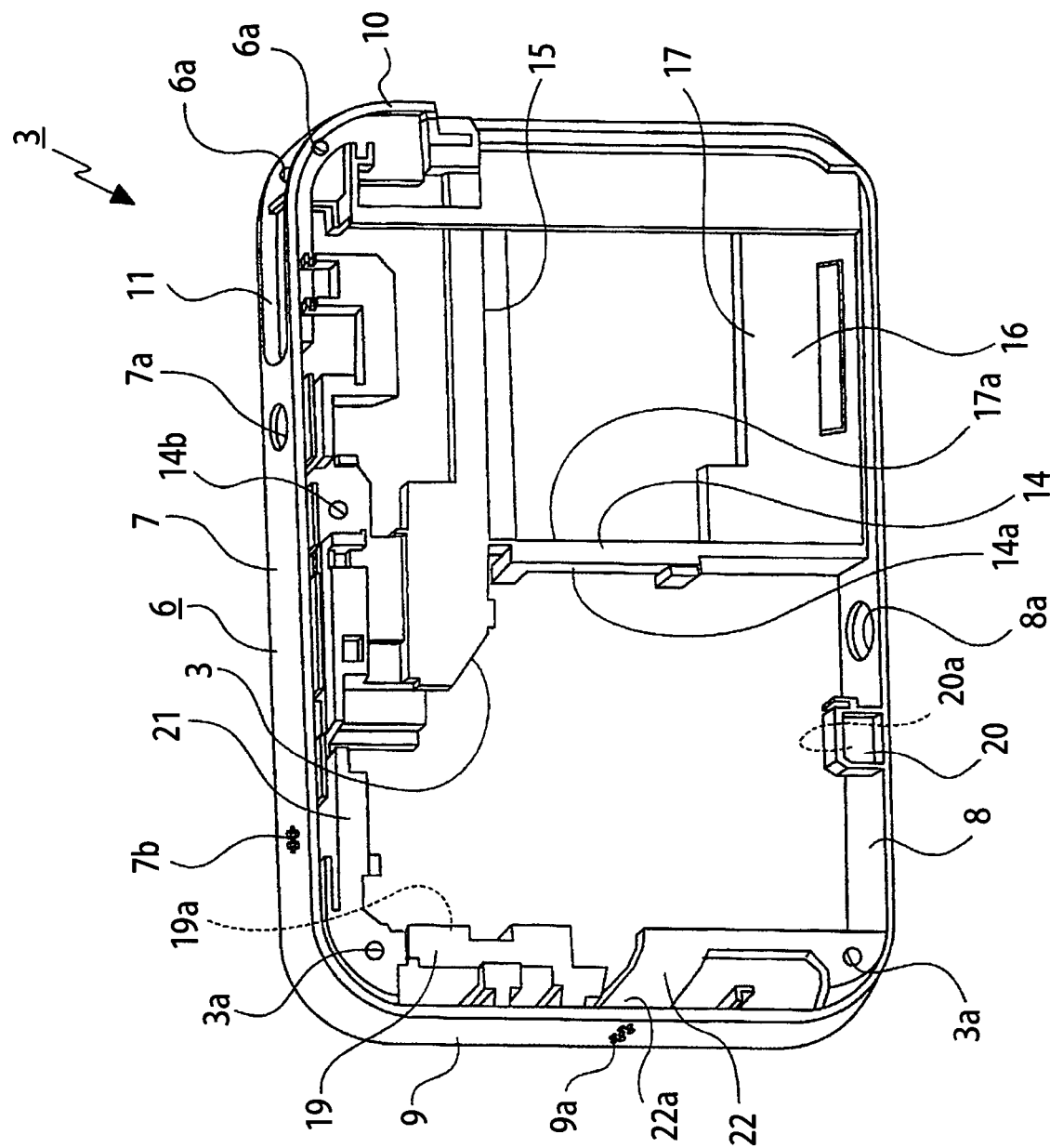
FIG. 4 is an enlarged perspective view indicating the rear side of the middle frame.

The middle frame 3 is formed by having its respective components integrated into one and with a resin material, and as shown in FIG. 3 and FIG. 4, includes a frame section 6 that is formed as a wide frame. The frame section 6 includes an upper side surface section 7, a lower side surface section 8, a left side surface section 9, and a right side surface section 10.

A button placement hole 7a and a microphone hole 7b are formed in the upper side surface section 7. In close proximity to the button placement hole 7a and in the upper side surface section 7 is formed a shallow member placement recessed section 11 whose upper side is open. An operation pin placement hole 11a is formed in the member placement recessed section 11.

A member placement hole 12 is formed in the frame section 6 at a position that is continuous with the member placement recessed section 11, and the member placement hole 12 is located on a portion that is continuous with the upper side surface section 7 and the right side surface section 10. Pin insertion holes 6a, 6a that penetrate the frame section 6 from the front through the rear are formed in the frame section 6 both in front of and behind the member placement hole 12.

In approximately the center in the horizontal direction of the lower side surface section 8 is formed a tripod hole 8a.

A speaker hole 9a is formed in the left side surface section 9.

A vertically long opening 10a that is continuous with the inside is formed in the right side surface section 10. A placement hole 10b is formed in the lower end section of the right side surface section 10 at a position in close proximity to the opening 10a.

Figure 5:
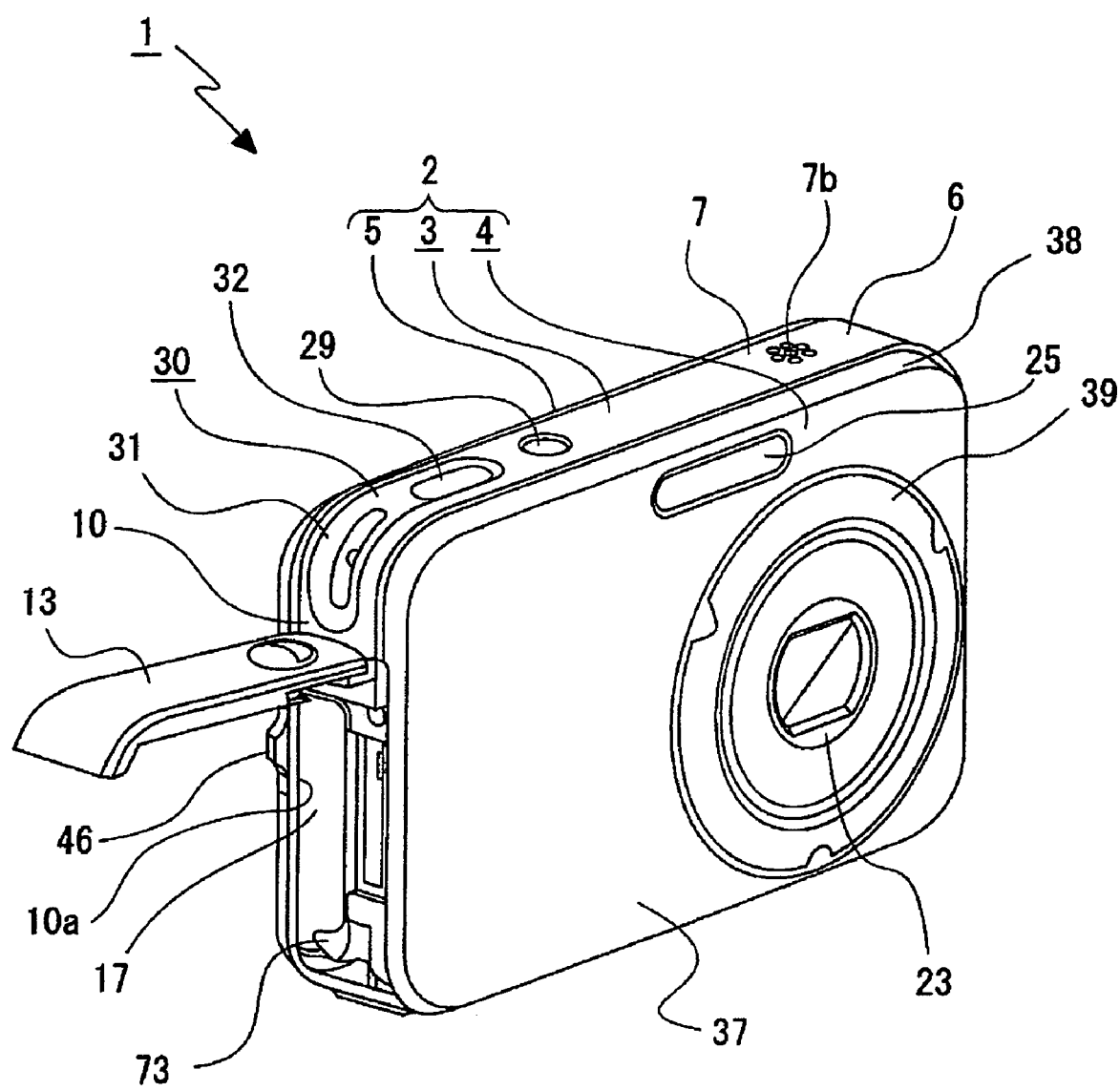
FIG. 5 is a perspective view of the still camera in a state where a battery lid is opened.

A battery lid 13 is supported on the right side surface section 10 in such a manner that it is freely openable and closable (see FIG. 1 and FIG. 5). The battery lid 13 is formed in a vertically long shape, and is made rotatable in relation to the middle frame 3 with its upper end section as the fulcrum. Through a rotating motion of the battery lid 13, the opening 10a and the placement hole 10b are opened and closed.

In the center portion of the middle frame 3 in the horizontal direction, there is provided a reinforcement section 14 which extends in the vertical direction and which is integrated with the middle frame 3 (see FIG. 3 and FIG. 4). The reinforcement section 14 links the approximately central portion of the upper side surface section 7 in the horizontal direction and the approximately central portion of the lower side surface section 8 in the horizontal direction, and the center portion of the reinforcement section 14 in the vertical direction is formed as a holding rib 14a.

Thus, since there is provided on the middle frame 3 the reinforcement section 14 that links the upper side surface section 7 and the lower side surface section 8, the strength of the middle frame 3 is high, and it is possible to increase the rigidity of the outer casing 2.

In addition, since the reinforcement section 14 is integrated with the middle frame 3, it is possible to increase the strength of the middle frame 3, while at the same time reducing the component count.

A restrictive wall section 15 that extends in the horizontal direction is provided on the middle frame 3. The ends of the restrictive wall 15 are continuous with a portion of the reinforcement section 14 towards its upper end and a portion of the right side surface section 10 towards its upper end, respectively.

A holding wall section 16 that extends in the horizontal direction is provided on the middle frame 3. The ends of the holding wall section 16 are continuous with the lower end section of the reinforcement section 14 and the lower end section of the right side surface section 10, respectively.

Of the middle frame 3, a battery loading section 17 into which a battery is loaded and which will be described later includes the right side surface section 10, the restrictive wall section 15, the reinforcement section 14 and the holding wall section 16, and the internal space of the battery loading section 17 is taken to be an insertion space 17a into which a battery is inserted.

A receiving surface section 18 that faces the front and rear directions is provided on the middle frame 3 at a position that is continuous with the upper end section of the reinforcement section 14 and with an approximately central portion of the upper side surface section 7 in the horizontal direction, and a unit receiving surface 18a is formed on the receiving surface section 18. A strobe fixing section 18b is provided on the receiving surface section 18.

A receiving surface section 19 that faces the front and rear directions is provided on the middle frame 3 at a position that is continuous with the left end portion of the upper side surface section 7 and the upper half portion of the left side surface section 9, and a unit receiving surface 19a is formed on the receiving surface section 19.

A receiving surface section 20 which faces the front and rear directions and which protrudes upward from a position towards the left end of the lower side surface section 8 is provided on the middle frame 3, and a unit receiving surface 20a is formed on the receiving surface section 20.

The unit receiving surfaces 18a, 19a and 20a are each formed in the shape of a shallow recess.

A microphone placement section 21 is provided on the middle frame 3 on the inner side of the upper side surface section 7. The microphone placement section 21 includes a placement recessed section 21a whose front is open.

A speaker placement section 22 is provided on the middle frame 3 on the inner side of the left side surface section 9. The speaker placement section 22 includes a placement recessed section 22a whose rear is open.

Screw insertion holes 3a, 3a that penetrate the middle frame 3 from the front through the rear are formed in the middle frame 3 both in the upper and lower end portions of the left end portion. A screw insertion hole 14b that penetrates the reinforcement section 14 from the front through the rear is formed in the upper end portion of the reinforcement section 14 of the middle frame 3.

On each portion of the middle frame 3 are arranged such components as the ones described below (see FIG. 6).

A lens unit 23 is placed on the receiving surface sections 18, 19 and 20 of the middle frame 3. The lens unit 23 may include, for example, a flat lens holder 24 on which an iris mechanism, various lenses, such as a focus lens, a zoom lens and the like, and so forth are held. The lens unit 23 is placed in such a manner that the rear surface of the outer circumference portion of the lens holder 24 is positioned and received by the unit receiving surfaces 18a, 19a and 20a that are formed on the receiving surface sections 18, 19 and 20, respectively. Therefore, the unit receiving surfaces 18a, 19a and 20a function as positioning sections for the lens unit 23.

A strobe 25 is fixed to and held by the strobe fixing section 18b of the receiving surface section 18 through some method such as adhesion.

A microphone 26 that is formed in the shape of an approximately circular disc is placed on and held by the microphone placement section 21. The microphone 26 is held in place by being inserted into the placement recessed section 21a of the microphone placement section 21.

A speaker 27 that is formed in the shape of an approximately circular disc is placed on and held by the speaker placement section 22. The speaker 27 is held in place by being inserted into the placement recessed section 22a of the speaker placement section 22.

The lens unit 23, the strobe 25, the microphone 26 and the speaker 27 mentioned above will be referred to as functional components that perform predetermined functions, and the unit receiving surfaces 18a, 19a and 20a, the strobe fixing section 18b, the microphone placement section 21 and the speaker placement section 22 will be referred to as component holding sections that hold functional components.

In the electronic apparatus 1, since the component holding sections that hold such functional components as the lens unit 23, the strobe 25, the microphone 26, the speaker 27 and the like are integrated into the middle frame 3, there is no need to use components dedicated to the purpose of holding various functional components, it is possible to cut down the component count, and therefore reduce manufacturing costs.

A circuit plate 28 is attached to the inside of the right end portion of the upper side surface section 7 of the middle frame 3. A circuit board (not shown in drawing) on which a switching circuit is formed is attached to the circuit plate 28, and the circuit board is placed in such a manner that it faces the inner surface of the upper side surface section 7.

A power button 29 is placed in the button placement hole 7a that is formed in the upper side surface section 7.

Figure 7:
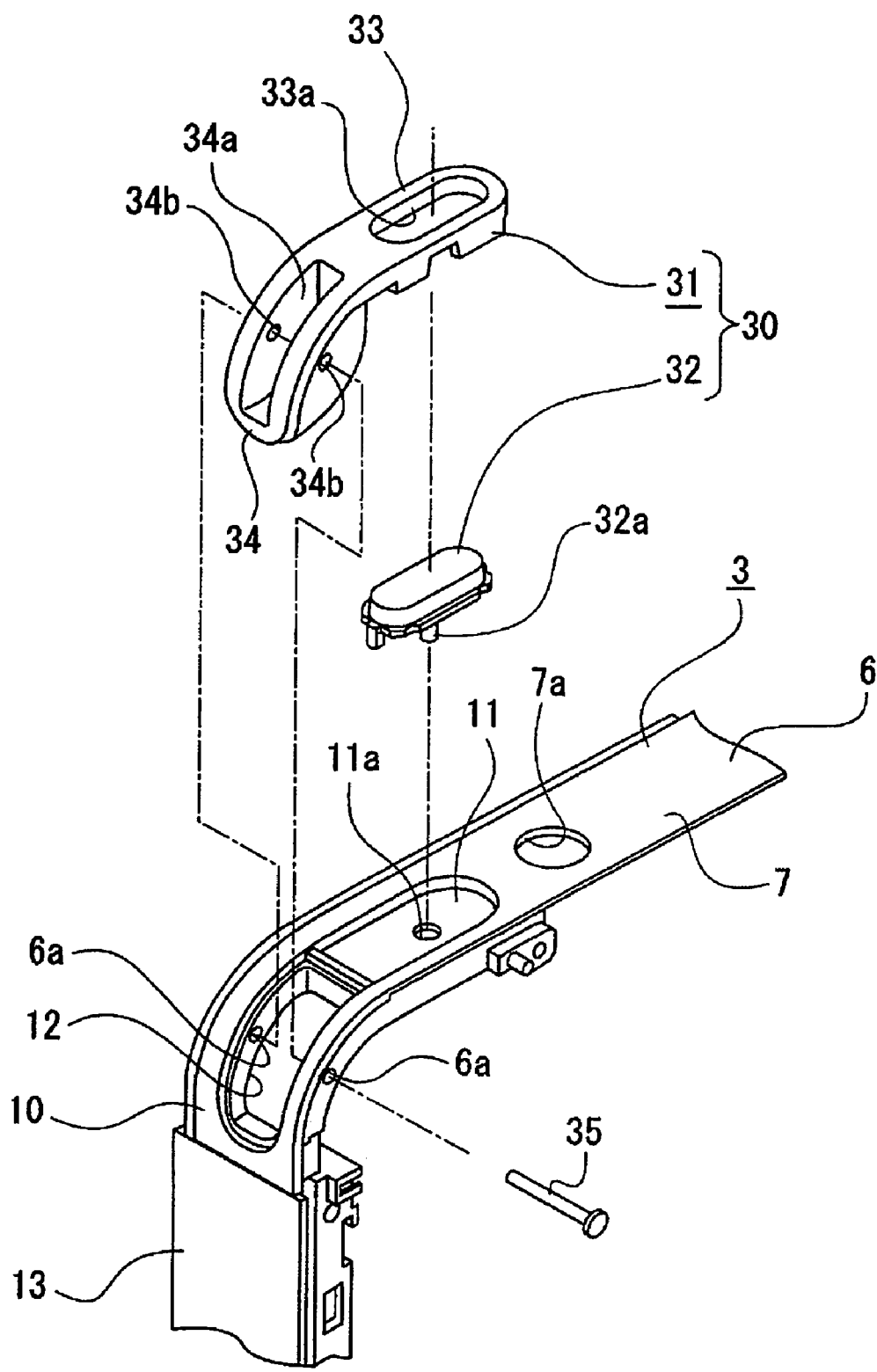
FIG. 7 is an en enlarged exploded perspective view indicating a portion of the middle frame and a shutter unit.

A shutter unit 30 is placed in the member placement recessed section 11 formed in the upper side surface section 7 (see FIG. 7). The shutter unit 30 includes a unit base 31 and a shutter button 32 that is supported by the unit base 31. The unit base 31 includes a linear section 33 that extends in the horizontal direction and an arc section 34, which is formed in the shape of an arc that is continuous with the right end of the linear section 33. A button hole 33a that penetrates the linear section 33 in the vertical direction is formed in the linear section 33. A groove 34a that extends in the horizontal direction is formed in the arc section 34, and pin attachment holes 34b, 34b that penetrate front and rear wall sections that form the groove 34a from the front through the rear are formed in those front and rear wall sections.

The shutter button 32 is placed in the button hole 33a of the unit base 31.

The shutter unit 30 is placed by having the linear section 33 of the unit base 31 inserted into the member placement recessed section 11 and by having the arc section 34 inserted into the member placement hole 12 adjacent to the member placement recessed section 11.

When the shutter unit 30 is placed as described above, an attachment pin 35 is inserted into the pin insertion holes 6a, 6a of the middle frame 3 and into the pin attachment holes 34b, 34b of the unit base 31. Thus, the unit base 31 is attached to the middle frame 3 with the attachment pin 35.

In addition, a portion of the attachment pin 35 is positioned within the groove 34a, and it is possible to wind and attach a strap (not shown in drawing) around and to this attachment pin 35.

As described above, the attachment pin 35 may function as a strap attachment section around which a strap can be wound in addition to serving the function of attaching the unit base 31 to the middle frame 3. Therefore, it is possible to reduce the component count.

In addition, when the strap is held, the entire weight of the electronic apparatus 1 will have to be supported by the attachment pin 35. However, since the attachment pin 35 is inserted through both the pin insertion holes 6a, 6a of the middle frame 3 as well as the pin attachment holes 34b, 34b of the unit base 31, the attachment strength is high, and it is able to withstand a large weight.

When the shutter unit 30 is attached to the middle frame 3, an operation pin 32a that protrudes downward from the shutter button 32 protrudes downward through the operation pin placement hole 11a that is formed in the member placement recessed section 11, and becomes able to operate a switch on the circuit board attached to the circuit plate 28.

Figure 6:
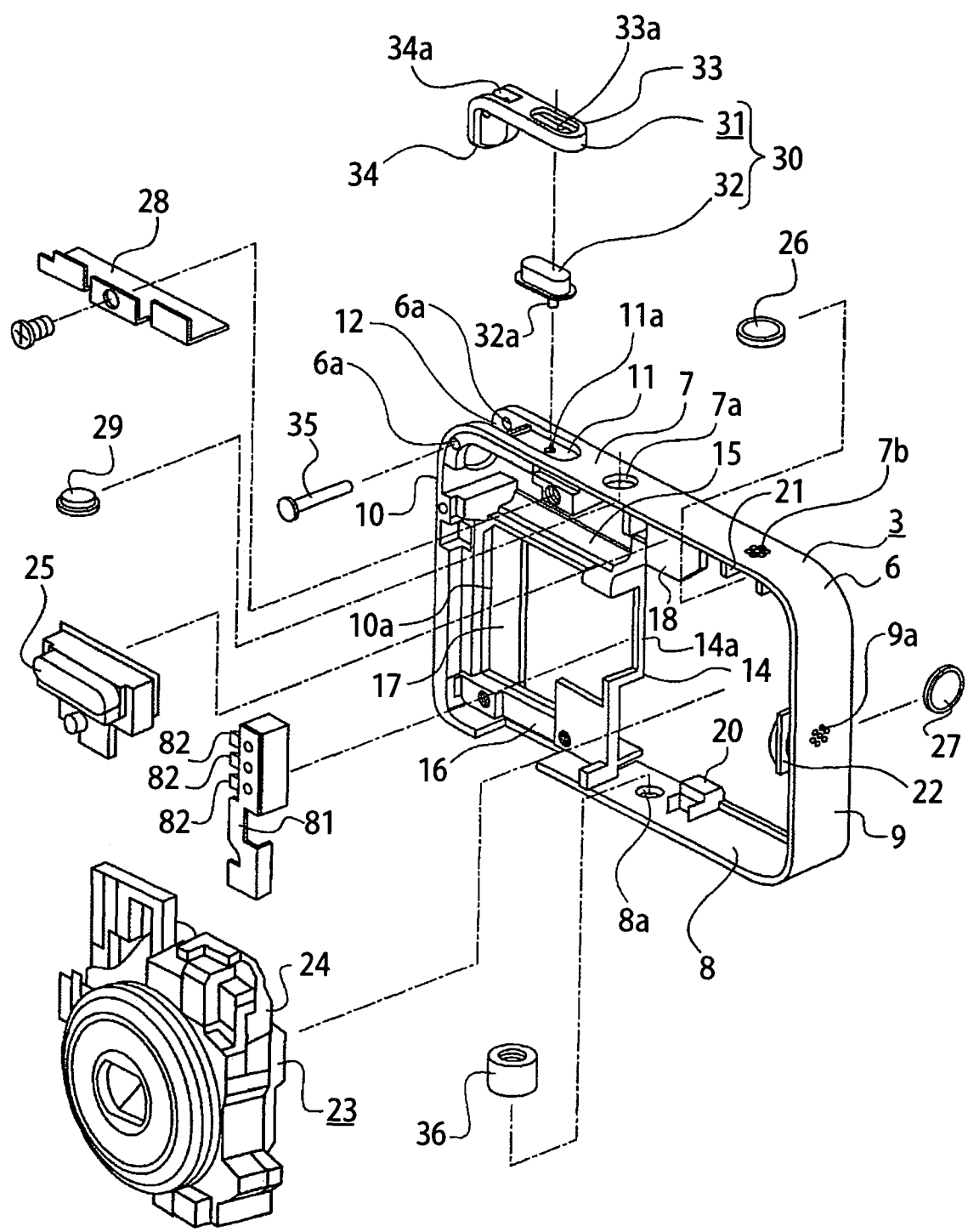
FIG. 6 is an exploded perspective view indicating the middle frame and components provided thereon.

A tripod female screw 36 is placed in the tripod hole 8a that is formed in the lower side surface section 8 of the middle frame 3 (see FIG. 6). Therefore, by inserting a screw section provided on the upper end portion of a tripod into the tripod hole 8a and engaging it with the tripod female screw 36, it is possible to mount the electronic apparatus 1 on a tripod.

Figure 8:
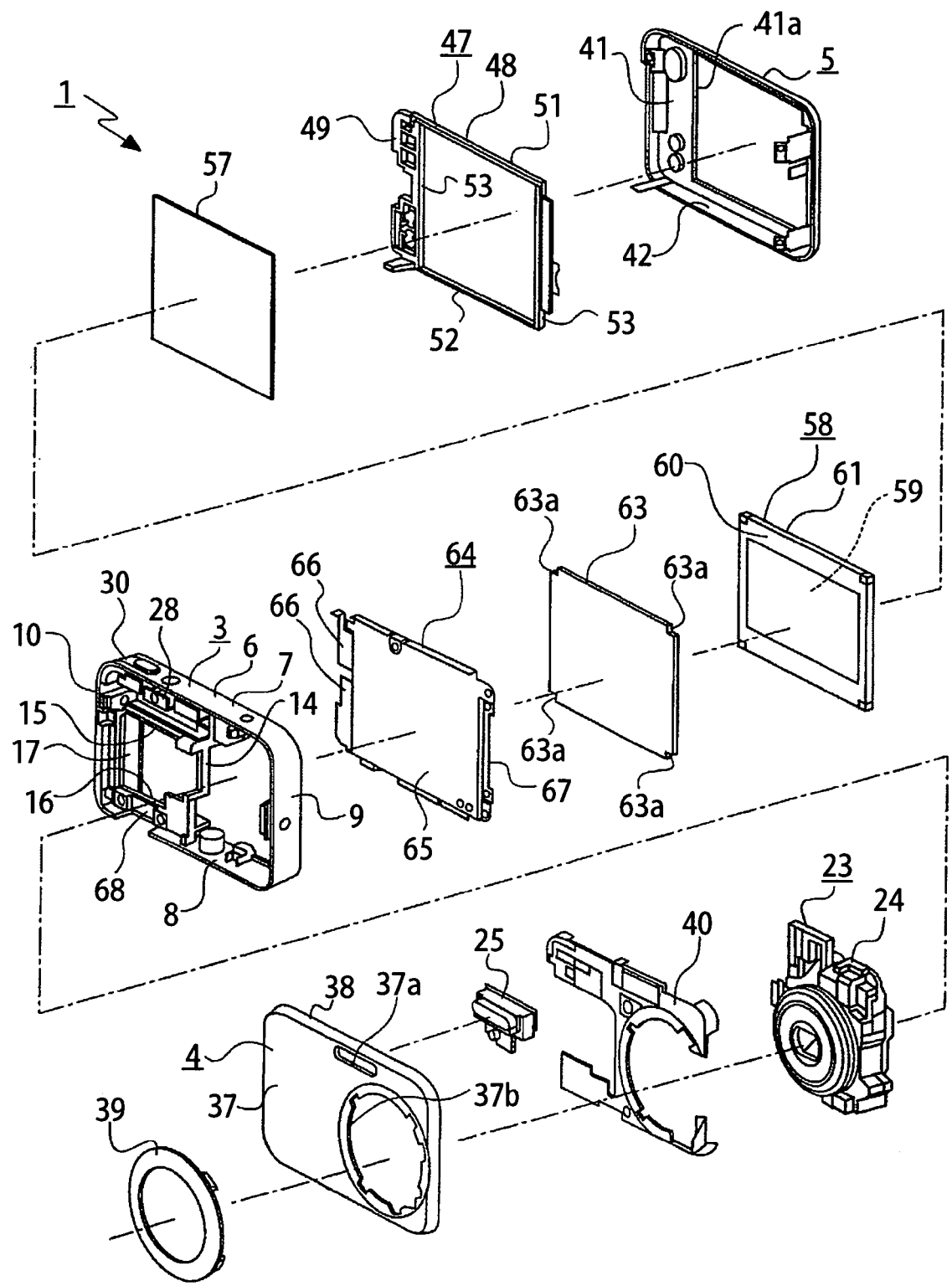
FIG. 8 is an exploded perspective view indicating the structure of the still camera.

The front panel 4 may be formed with, for example, some metal material such as aluminum and the like. By thus forming the front panel 4 with a metal material, it is possible to improve heat radiation, and therefore effectively suppress an increase in the internal temperature of the electronic apparatus 1. As shown in FIG. 8, the front panel 4 includes a front surface section 37 that is formed in a wide and approximately rectangular shape, and a rim section 38 that protrudes approximately towards the rear slightly from the periphery of the front surface section 37. A wide flash hole 37a is formed in the upper end portion of the front surface section 37, and a large opening 37b is formed in the left half section of the front surface section 37.

A ring panel 39 is attached to the front surface section 37 of the front panel 4 at a position where the rim of the opening 37b can be covered (see FIG. 1 and FIG. 8).

A holding member 40 that is formed with, for example, a resin material is attached to the rear surface of the front surface section 37 of the front panel 4 through adhesion and the like. When the front panel 4 is attached to the middle frame 3, the holding member 40 serves to hold the various components arranged on the middle frame 3.

The rear panel 5 may be formed with, for example, some metal material such as aluminum and the like. By thus forming the rear panel 5 with a metal material, it is possible to improve heat radiation, and therefore effectively suppress an increase in the internal temperature of the electronic apparatus 1.

As shown in FIG. 8, the rear panel 5 includes a rear surface section 41 that is formed in a wide and approximately rectangular shape, and a rim section 42 that protrudes approximately towards the front slightly from the periphery of the rear surface section 41. A large opening 41a of a rectangular shape is formed in the rear surface section 41.

Figure 2:
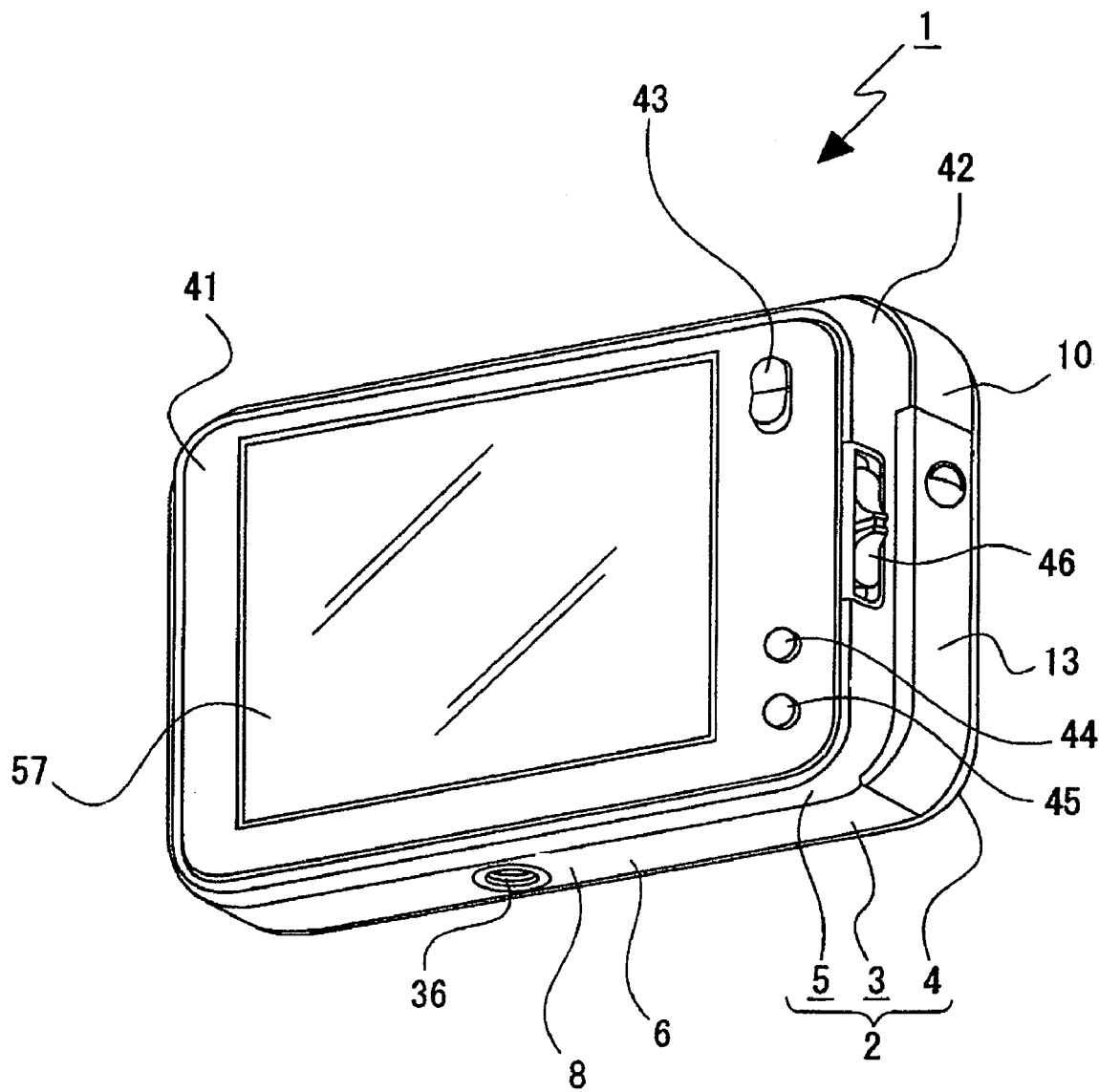
FIG. 2 is a perspective view indicating the rear side of the still camera.

Operation buttons 43, 44 and 45, and a slide tab 46 are arranged on the right end portion of the rear panel 5 at predetermined positions (see FIG. 2). The operation buttons 43, 44 and 45, and the slide tab 46 are placed in their respective button placement holes formed in the rear panel 5. The operation button 43 is a zoom button for zooming while photographing. Operation buttons 44 and 45 are, for example, buttons for switching between various modes and the like. The slide tab 46 is a tab for switching between such modes as photograph mode, play mode and the like.

With the middle part in the vertical direction as a point of reference, the operation button 43 is operable in such a manner that the upper half section and the lower half section can be held separately, and through such an operation, wide angle shots or zoom shots may be photographed.

A panel holder 47 that is formed with, for example, a resin material is attached to the front surface of the rear surface section 41 of the rear panel 5 through adhesion or the like (see FIG. 8).

Figure 9:
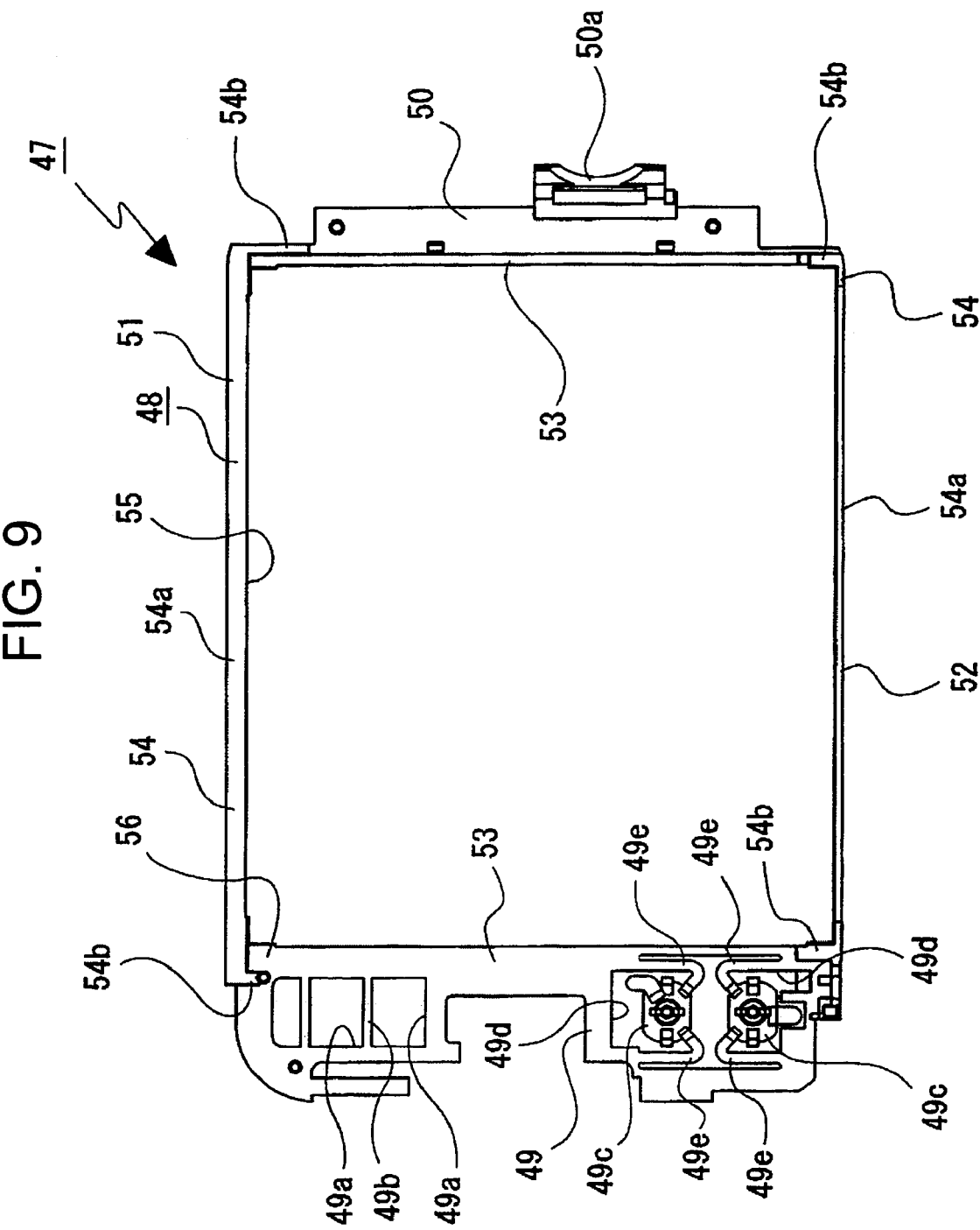
FIG. 9 is an enlarged front view of a panel holder.
Figure 10:
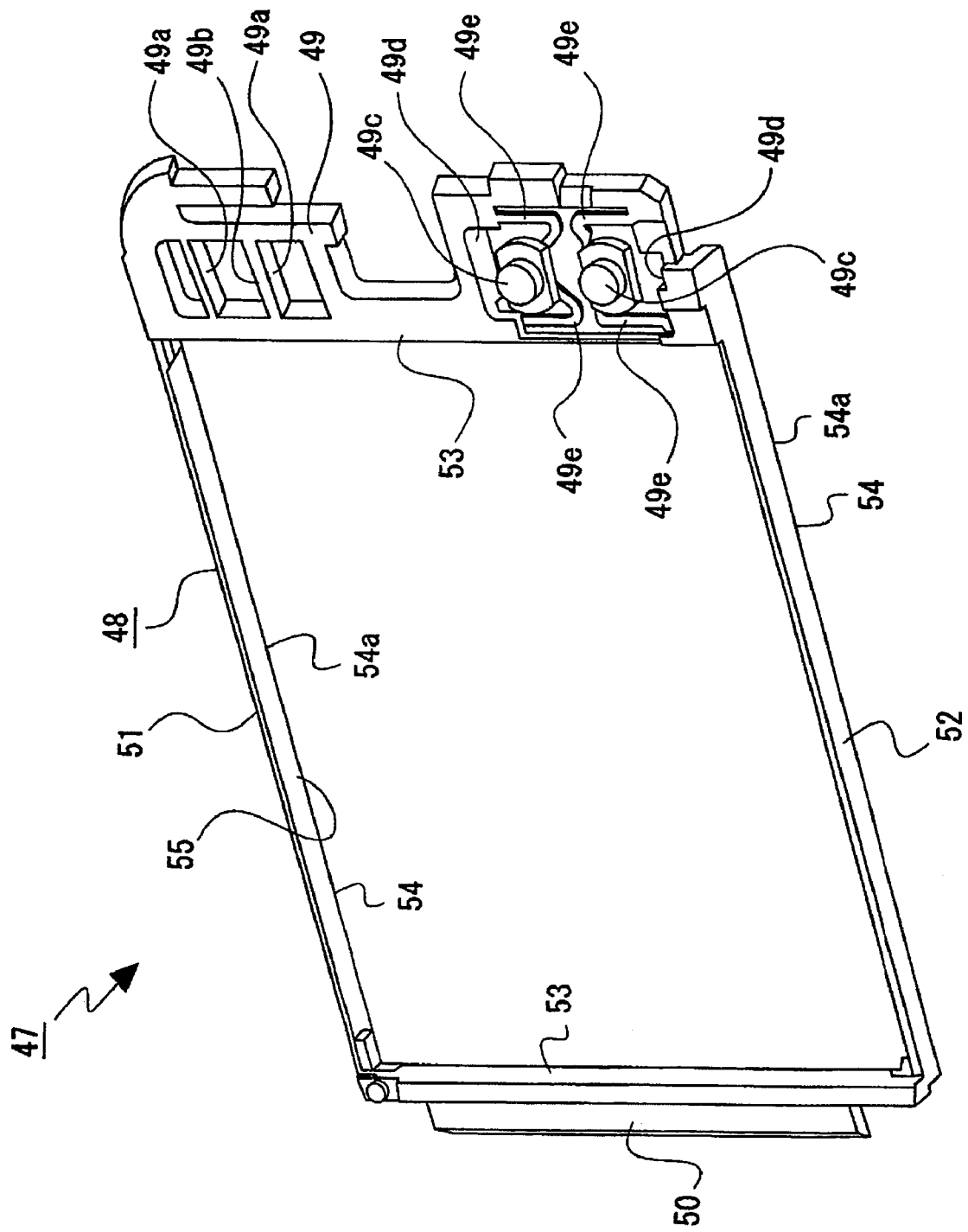
FIG. 10 is an enlarged perspective view of the panel holder.

As shown in FIG. 9 and FIG. 10, the panel holder 47 includes a frame section 48 that has a wide rectangular shape, an operation surface section 49 that is provided in a continuous manner with the right rim of the frame section 48, and a protruding surface section 50 that is provided in a continuous manner with the left rim of the frame section 48, all of which are integrated into one.

Figure 11:
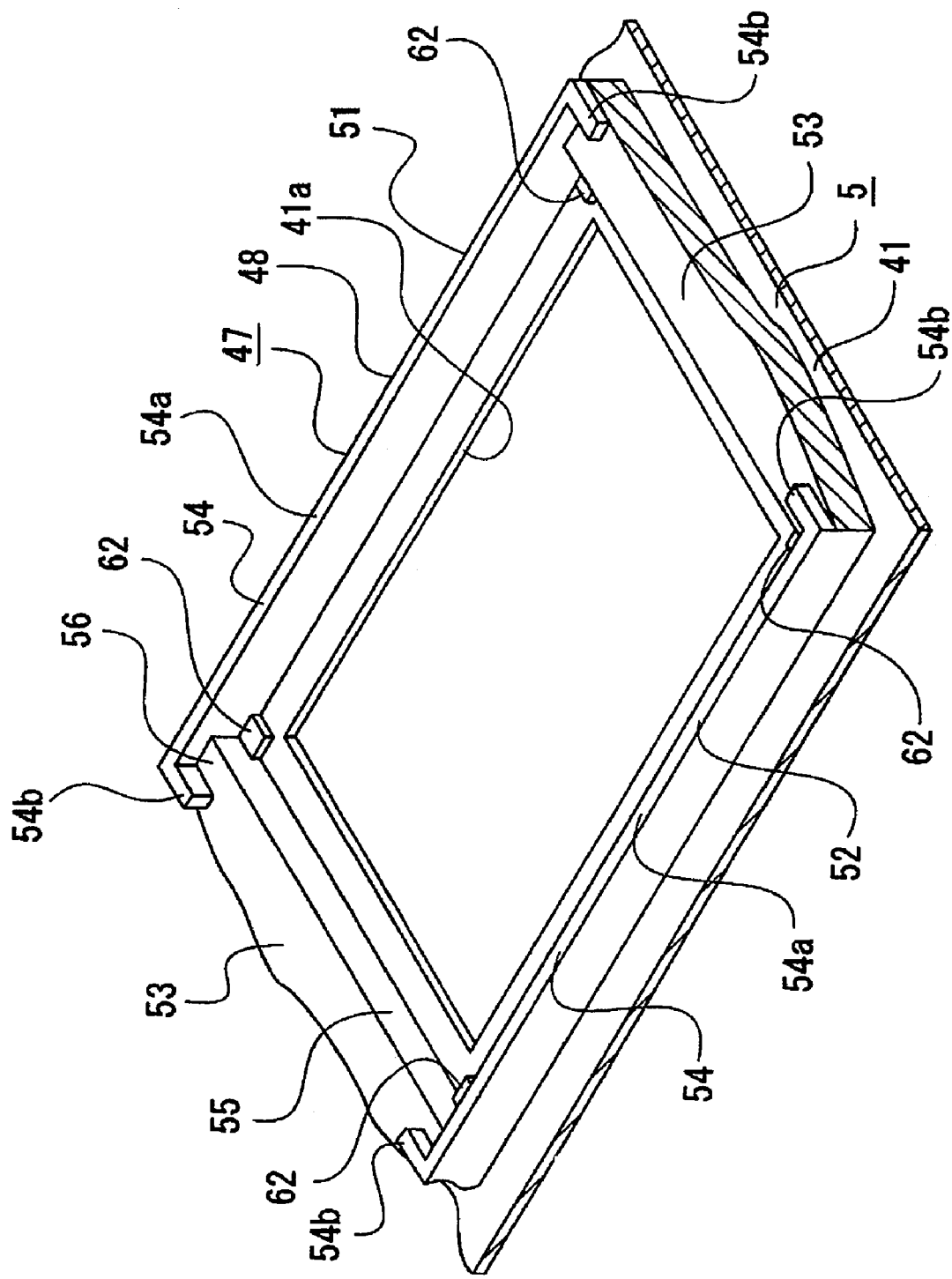
FIG. 11 is an enlarged perspective view indicating each positioning section of the panel holder.

The frame section 48 includes an upper section 51, a lower section 52 and a pair of side sections 53, 53, and elevated sections 54, 54 that protrude further forward than the other sections do are provided on, for example, the upper section 51 and the lower section 52 (see FIG. 9 through FIG. 11). The elevated sections 54, 54 include extension sections 54a, 54a that extend in the horizontal direction, and protruding sections 54b, 54b . . . that protrude downward or upward from the left and right end sections of the extension sections 54a, 54a, respectively.

Parts of the frame section 48 where the elevated section 54, 54 are not provided are provided as a first panel positioning section 55 that is positioned behind the elevated sections 54, 54, and the front surface of the side sections 53, 53 and the elevated sections 54, 54 may form a second panel positioning section 56.

As shown in FIG. 9 and FIG. 10, two operation holes 49a, 49a are aligned vertically on the upper side of the operation surface section 49 of the panel holder 47, and a button receiving section 49b that extends in the horizontal direction is provided between the operation holes 49a, 49a. The operation button 43 that functions as a zoom button is pressed from behind by this button receiving section 49b, and the upper half section and the lower half section of the operation button 43 are made separately operable with the middle part, in the vertical direction, as a point of reference.

It is noted that a circuit board for the switches, which is not shown in drawing, is placed on the front surface side of the operation surface section 49, and when the operation button 43 is pressed and operated, a push switch provided on the circuit board for the switches is operated via the operation holes 49a, 49a, thereby realizing a zooming function.

As described above, by integrating into the panel holder 47 the button receiving section 49b that presses the operation button 43, it is possible to reduce the component count.

Two operation panel sections 49c, 49c are aligned vertically on the lower side of the operation surface section 49. The operation panel sections 49c, 49c are positioned within formed holes 49d, 49d, respectively, that are aligned vertically in the operation surface section 49, and each is linked to another part of the operation surface section 49 through two arm sections 49e, 49e . . . that are elastically distortable.

The above-mentioned operation buttons 44 and 45 are linked with the rear surfaces of the operation panel sections 49c, 49c, respectively. When the operation buttons 44 and 45 are pressed, the operation panel sections 49c, 49c are moved forward due to the elastic distortion of the arm sections 49e, 49e . . . , and push switches provided on the above mentioned circuit board for the switches are operated by the operation panel sections 49c, 49c, and predetermined functions are thus realized. When the pressure on the operation buttons 44 and 45 are released, the operation panel sections 49c, 49c move backward due to the elastic return of the arm sections 49e, 49e . . . and return to their original positions.

As described above, by integrating the operation panel sections 49c, 49c that operate in accordance with operations of the operation buttons 44, 45, as well as the arm sections 49e, 49e . . . into the panel holder 47, it becomes unnecessary to employ spring means for returning the operation buttons 44 and 45 to their original positions after they are operated, and it is thus possible to reduce the component count.

It is noted that the operation buttons 44 and 45 may also be integrated into the operation panel sections 49c, 49c. By integrating the operation buttons 44 and 45 into the operation panel sections 49c, 49c, the component count can be further reduced.

A speaker holding section 50a that protrudes-forward is provided on the protruding surface section 50 of the panel holder 47. When the rear panel 5 is attached to the middle frame 3, the speaker 27 that is placed in the speaker placement section 22 of the middle frame 3 is held by the speaker holding section 50a, and the speaker 27 is prevented from slipping out of the speaker placement section 22.

A touch panel 57 and a liquid crystal panel 58 are positioned and held by the panel holder 47 (see FIG. 8).

Figure 12:
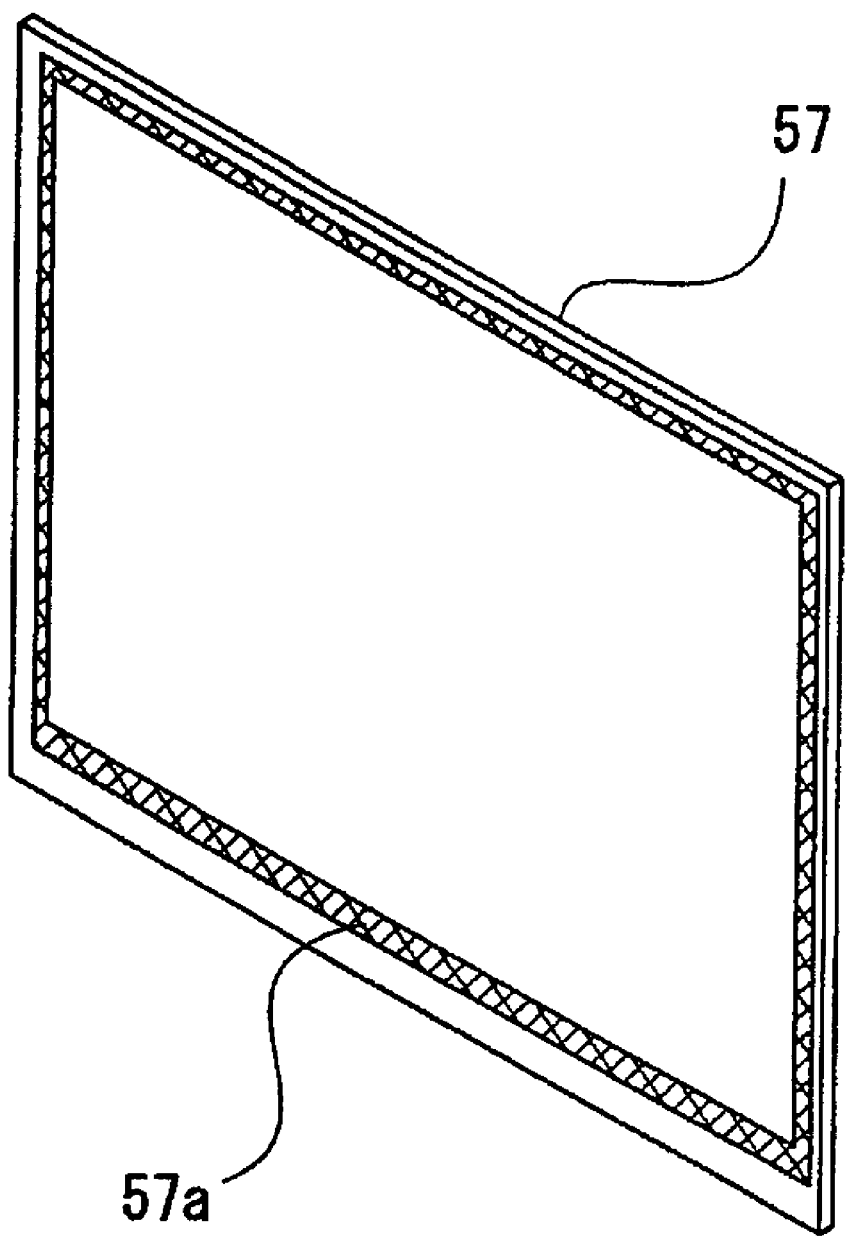
FIG. 12 is a perspective view of a touch panel.

The touch panel 57 is so formed to be of a rectangular shape that is slightly larger than the opening section 41a formed in the rear panel 5, and serves the function of an operation section that executes predetermined functions by being touch operated with the finger, a stylus and the like. In general, there is a pattern section 57a on the touch panel 57 for operation execution, and the pattern section 57a is positioned along the entire circumference that leans towards the outer side (see FIG. 12). The pattern section 57a is the portion of the touch panel 57 that is the weakest.

Figure 13:
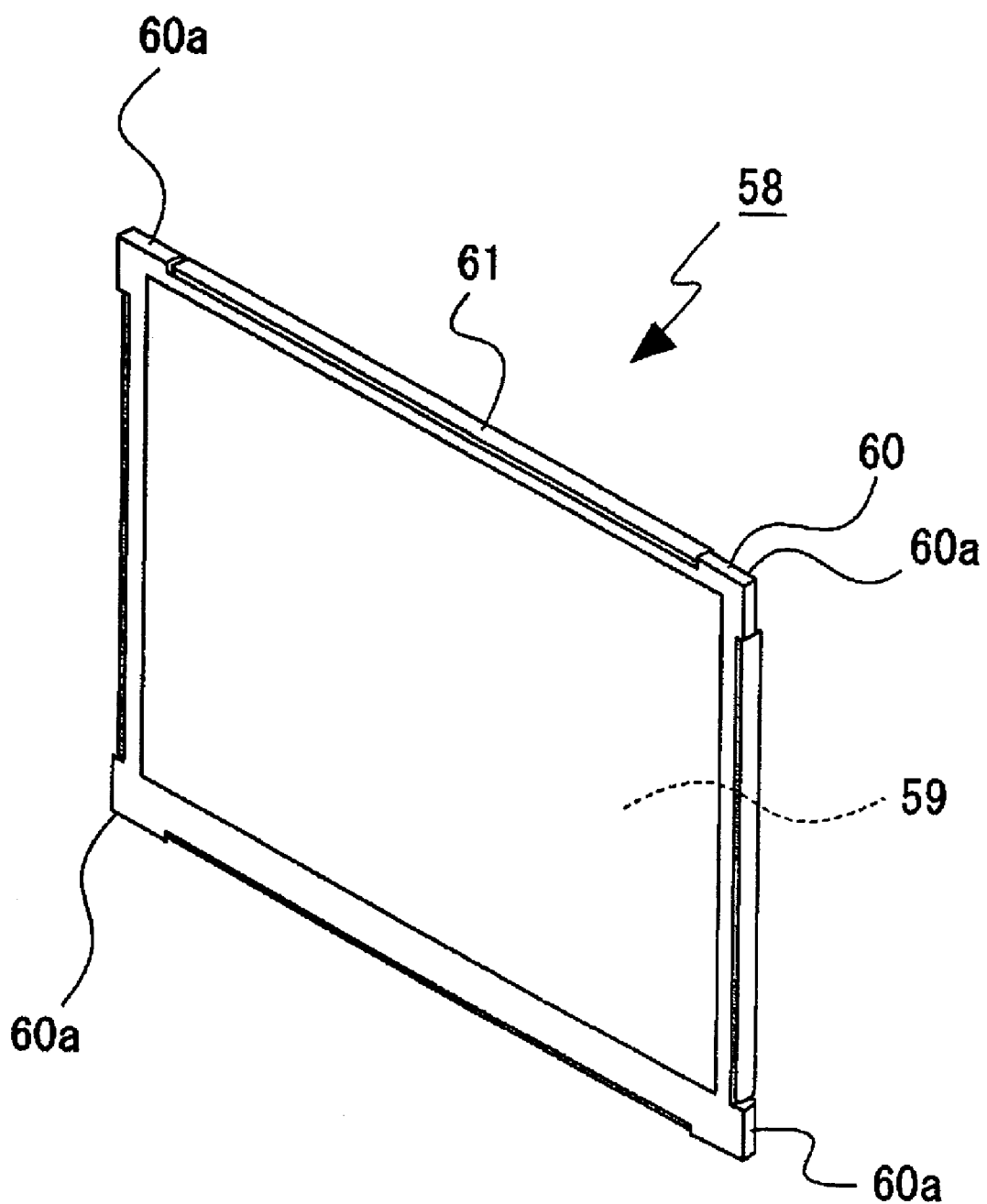
FIG. 13 is a perspective view of a liquid crystal panel.

The liquid crystal panel 58 functions as a display section for displaying images, text and the like, and is formed to be approximately equal in size with the touch panel 57. As shown in FIG. 13, the liquid crystal panel 58 includes a liquid crystal display section 59 and a holding frame 60 that holds the liquid crystal display section 59 and is attached to a panel attachment board 61.

The holding frame 60 is provided as positioning protrusions 60a, 60a . . . where the four corners are formed like hooks that protrude further outward than the other parts.

The panel attachment board 61 is so provided to cover, of the outer circumference portion of the holding frame 60, parts other than the positioning protrusions 60a, 60a . . . .

The liquid crystal panel 58 and the touch panel 57 are joined and integrated front to back through adhesion or the like, and the pattern section 57a of the touch panel 57 is so positioned to align with the outer side of the liquid crystal display section 59, in other words, the inner circumference portion of the holding frame 60.

Figure 14:
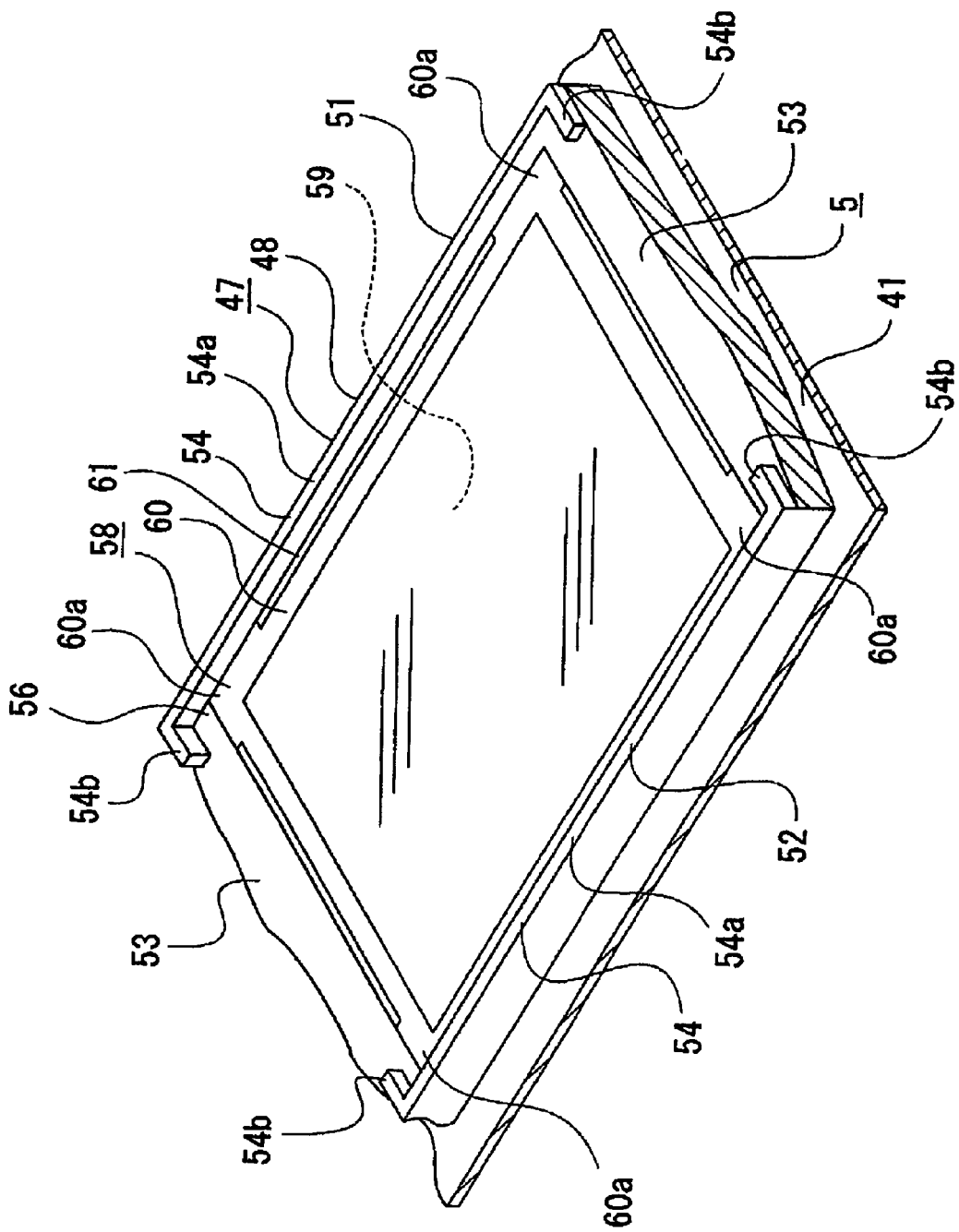
FIG. 14 is an enlarged perspective view indicating a state where the touch panel and the liquid crystal panel are positioned and placed by a first positioning section of the panel holder.

When the touch panel 57 and the liquid crystal panel 58 are joined, they are positioned and held by the panel holder 47 that is attached to the rear panel 5 (see FIG. 14). The touch panel 57 and the liquid crystal panel 58 are positioned and held by being fit within the first panel positioning section 55 of the panel holder 47 while seat cushions 62, 62 . . . (see FIG. 11) are adhered to the inner rim of the opening section 41a of the rear panel 5.

Here, since the positioning protrusions 60a, 60a . . . of the liquid crystal panel 58 fit with the four corners of the first panel positioning section 55, the touch panel 57 and the liquid crystal panel 58 are securely positioned, and it is possible to improve the positioning accuracy of the touch panel 57 and the liquid crystal panel 58 in relation to the rear panel 5.

In addition to the touch panel 57 and the liquid crystal panel 58, a back light panel 63 is also positioned and held by the panel holder 47 (see FIG. 8).

The back light panel 63 is formed in the shape of a flat plate that is slightly larger than the liquid crystal panel 58 and has, for example, positioning notches 63a, 63a . . . formed in its four corners.

Figure 15:
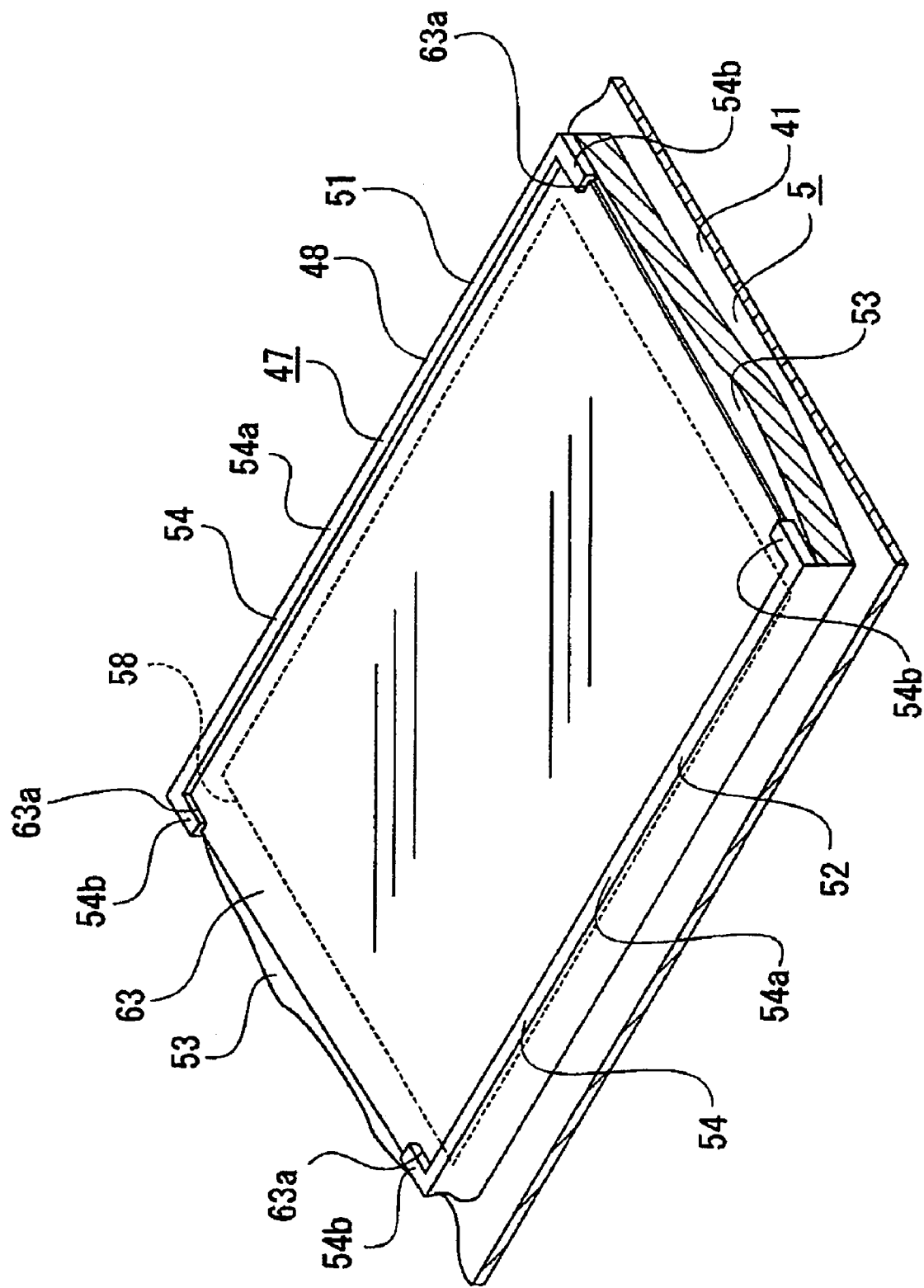
FIG. 15 is a perspective view indicating a state where a back light panel is positioned and placed by a second positioning section of the panel holder.

The back light panel 63 is positioned and held by the panel holder 47 that is attached to the rear panel 5 (see FIG. 15). The positioning notches 63a, 63a . . . are each engaged with the protruding sections 54b, 54b of the elevated sections 54, 54, respectively, and the back light panel 63 is thus positioned and held by the second panel positioning section 56 of the panel holder 47.

Figure 16:
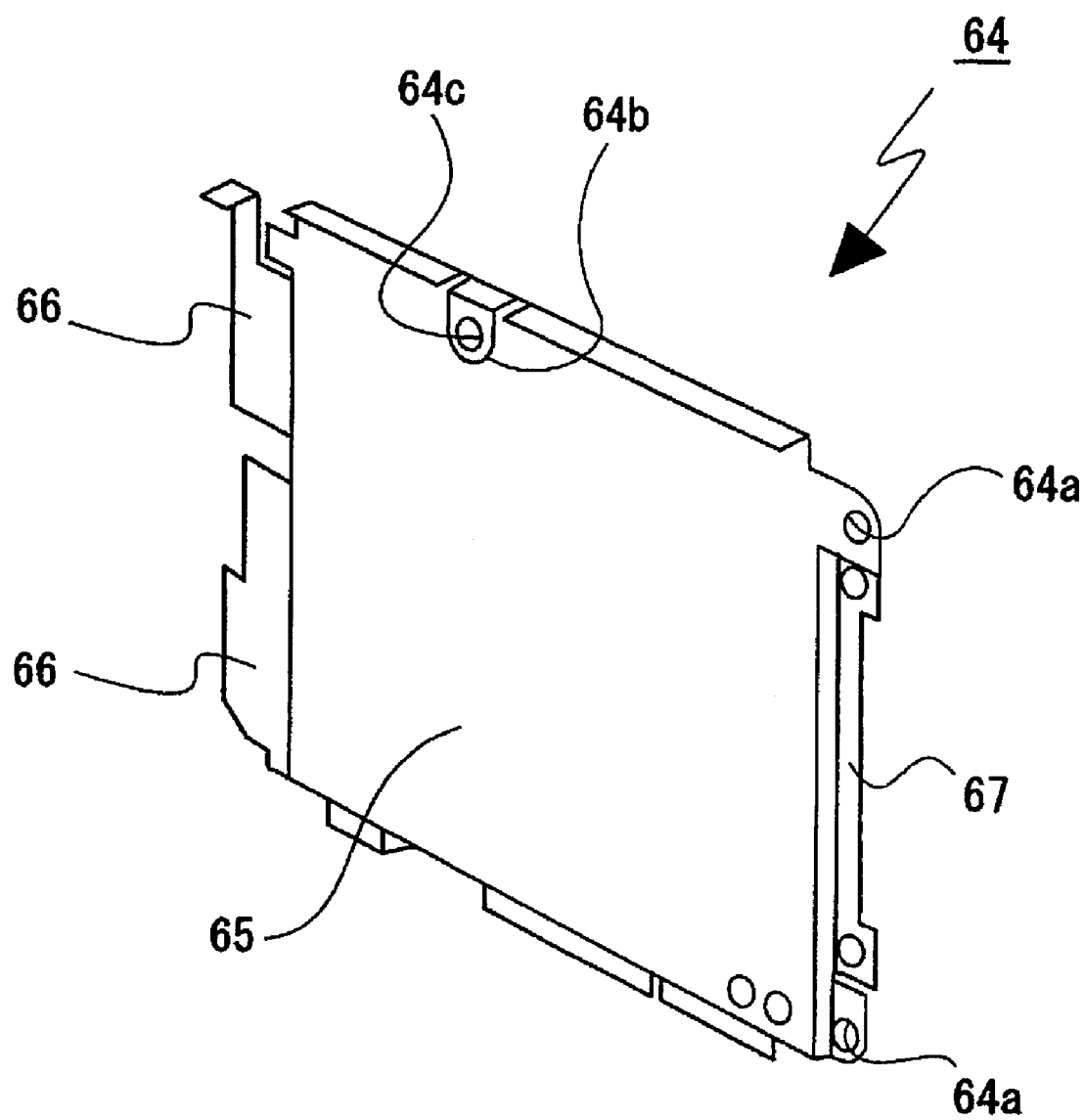
FIG. 16 is a perspective view of a holding plate.

The back light panel 63 is held from the front side by the holding plate 64. As shown in FIG. 16, the holding plate 64 includes a holding section 65 that is formed in the shape of a wide rectangle, and attachment sections 66, 66, 67 that are provided on the left and right edges of the holding section 65, respectively, in a continuous manner. The attachment section 66, 66, 67 are positioned slightly backwards in relation to the holding section 65. Screw insertion holes 64a, 64a are formed vertically spaced apart in the left edge section of the holding plate 64. On the upper edge section of a portion of the holding plate 64 that is approximately in the middle in the horizontal direction, a folded piece 64b that is folded forward is provided, and a screw hole 64c is formed in the folded piece 64b.

The holding plate 64 is attached to the middle frame 3 by having an attachment screw, which is not shown in drawing and which is screwed through the screw insertion hole 14b formed in the reinforcement section 14 of the middle frame 3, screwed into the screw hole 64c. In addition, the holding plate 64 is attached to the rear panel 5 by having attachment screws, which are not shown in drawing and which are inserted through the screw insertion holes 3a, 3a, respectively, of the middle frame 3, inserted through the screw insertion holes 64a, 64a and engaged with screw engagement sections of the rear panel 5, which are not shown in drawing.

When the holding plate 64 is attached to the rear panel 5, the holding section 65 is held against the front surface of the back light panel 63, and the back light panel 63 is thus held by the holding section 65. When the back light panel 63 is held by the holding section 65, the back light panel 63 is held against the liquid crystal panel 58, and the liquid crystal panel 58 and the touch panel 57 are thus held.

Figure 17:
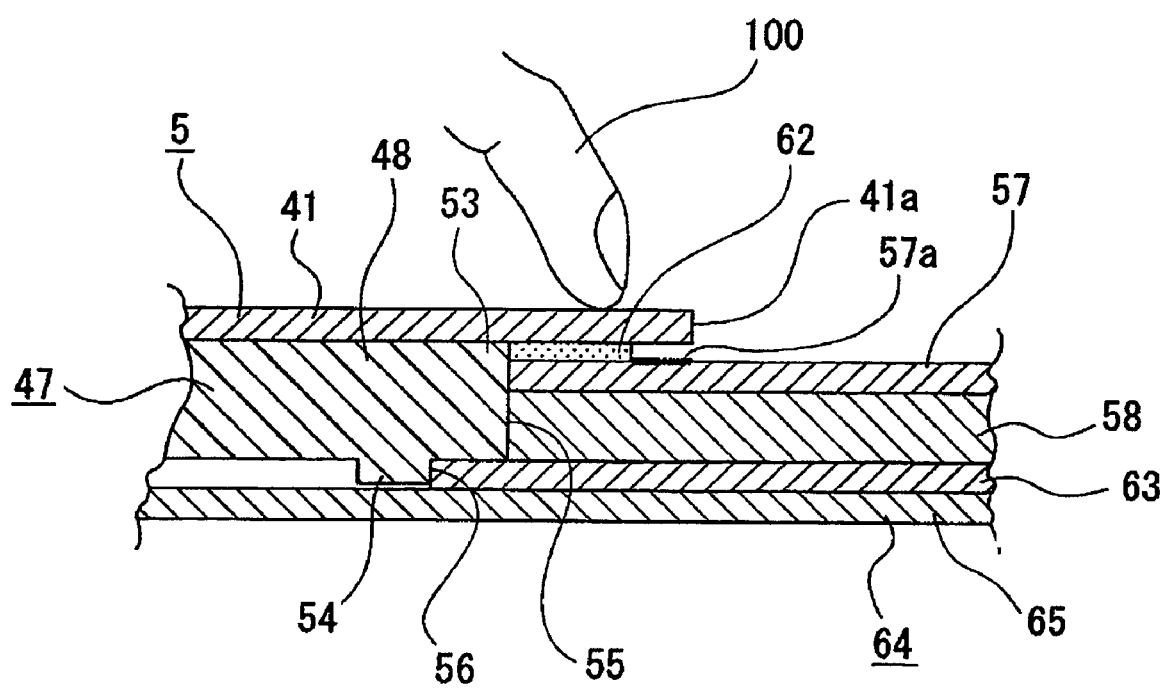

When the touch panel 57, the liquid crystal panel 58, and the back light panel 63 are held in the manner described above, a gap is formed between the touch panel 57 and the inner perimeter of the rear panel 5 as shown in FIG. 17.

Therefore, even when a portion near the opening section 41a of the rear panel 5 is held by a finger 100 while the photographer holds the electronic apparatus 1 in his hand while using the electronic apparatus 1, the rear panel 5 does not come into contact with the touch panel 57, and it is thus possible to prevent such failures as malfunctioning, breakage or the like of the touch panel 57.

In particular, since a gap is formed between the pattern section 57a, which is the weakest portion of the touch panel 57, and the rear panel 5, it is possible to prevent contact between the pattern section 57a and the rear panel 5, thereby securing the reliability of the functioning of the touch panel 57.

In addition, as described above, since the touch panel 57, the liquid crystal panel 58 and the back light panel 63 are positioned by the same panel holder 47, it is possible to secure ideal positioning accuracy of the touch panel 57, the liquid crystal panel 58 and the back light panel 63 in relation to the rear panel 5, while at the same time securing ideal positioning accuracy between the touch panel 57, the liquid crystal panel 58 and the back light panel 63.

Figure 18:
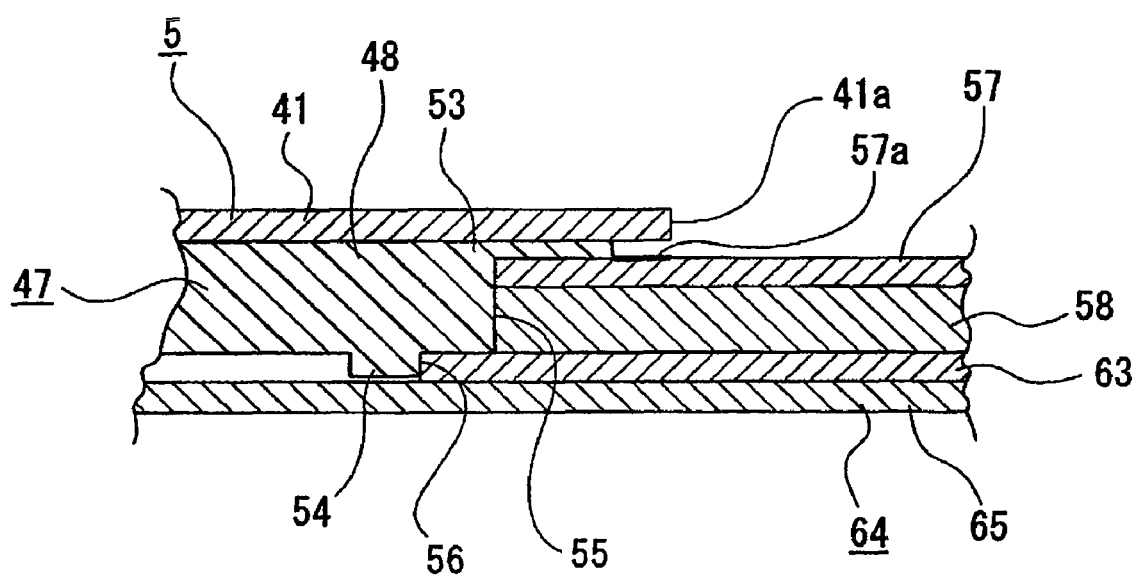

It is noted that although in the description above, an example is given where the seat cushions 62, 62 . . . are placed between the touch panel 57 and the rear surface section 41 of the rear panel 5, it is also possible to form a gap between the touch panel 57 and the rear panel 5 by, for example, providing receiving sections 47a, 47a . . . as integrated parts of the panel holder 47 by making parts of the rear end section of the panel holder 47 protrude inward, and receiving the touch panel 57 with the receiving sections 47a, 47a . . . as shown in FIG. 18.

Thus, by integrating the receiving sections 47a, 47a . . . into the panel holder 47, the seat cushions 62, 62 . . . become unnecessary, and it becomes possible to reduce the component count while also saving the trouble of having to adhere the seat cushions 62, 62 . . . to the rear panel 5.

As described above, with respect to the electronic apparatus 1, the outer casing 2 includes three components, namely, the middle frame 3, the front panel 4, which is joined with the front of the middle frame 3, and the rear panel 5, which is joined with the rear of the middle frame 3.

Therefore, the component count is small, such procedures as putting components together through screwing, caulking and the like are reduced, and an improvement in efficiency may be expected.

In addition, since the various parts of the middle frame 3, which is placed between the front panel 4 and the rear panel 5, are integrated into one, it is possible to secure high strength for the outer casing 2.

It is noted that in apparatuses that include the touch panel 57 as the electronic apparatus 1 does, although the touch panel 57, the liquid crystal panel 58 and the back light panel 63 are prone to loads that accompany manual operations of the touch panel 57, since the holding plate 64 that presses the back light panel 63, and the holding rib 14a that presses the holding plate 64 are provided in the electronic apparatus 1, it is possible to reliably prevent deformation or breakage of the touch panel 57, the liquid crystal panel 58, and the back light panel 63.

In addition, since the touch panel 57, the liquid crystal panel 58 and the back light panel 63 are held by the holding plate 64 and the holding rib 14a, it becomes possible to suppress deformation of the touch panel 57 and the liquid crystal panel 58, and an improvement in the usability of the touch panel 57 and the liquid crystal panel 58 by making them larger may be achieved.

When the back light panel 63 is held from the front by the holding plate 64 as described above, the middle frame 3 and the rear panel 5 are joined through some appropriate means, such as screws and the like, and the middle frame 3 and the front panel 4 are also joined through some appropriate means, such as screws and the like.

Figure 19:
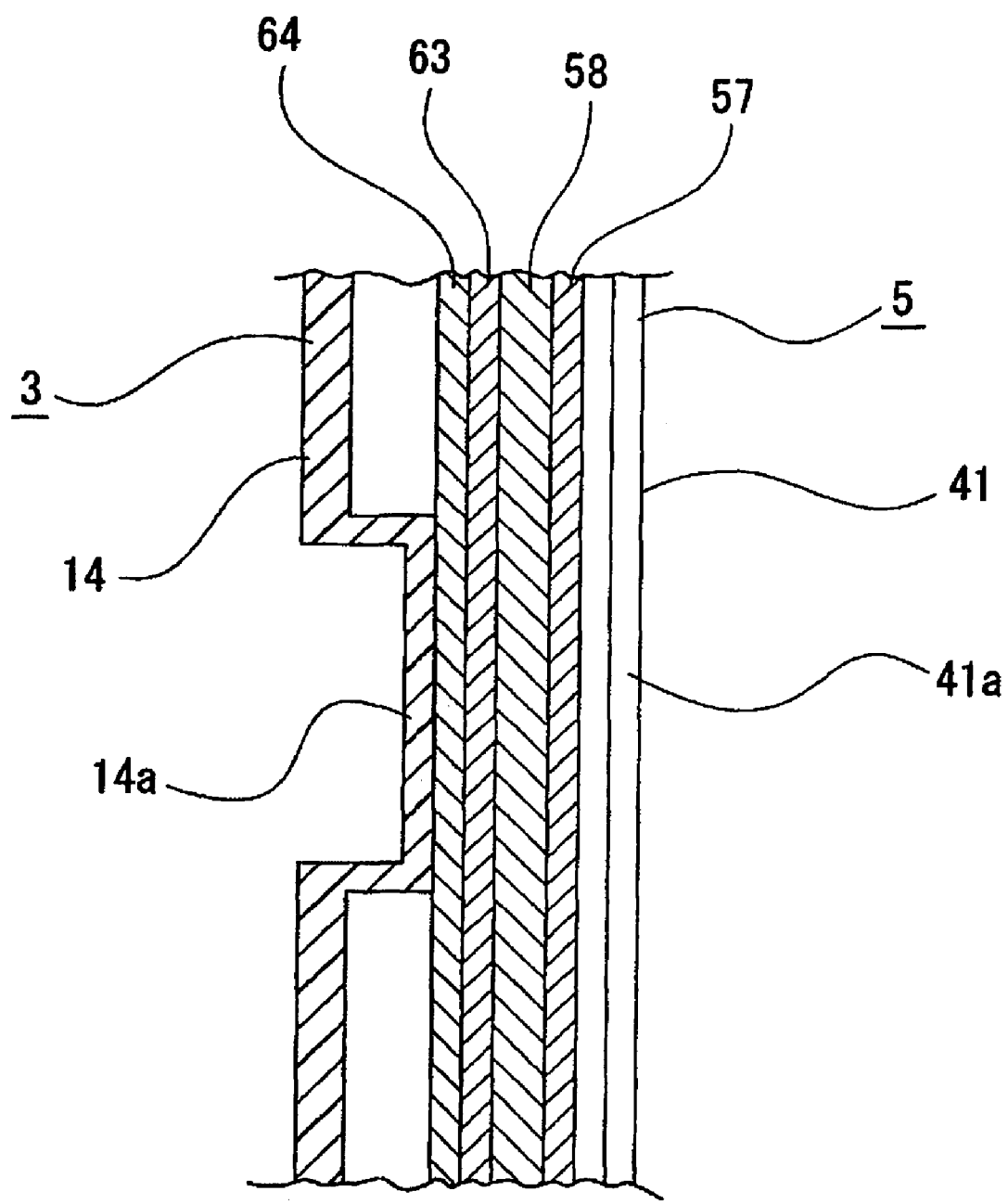
FIG. 19 is an enlarged sectional view indicating a state where the holding plate is being held by a holding rib of the middle frame.

When the middle frame 3 and the rear panel 5 are joined, the holding rib 14a of the middle frame 3 is held against the front surface of the holding section 65 of the holding plate 64, and the holding plate 64 is thus held by the holding rib 14a (see FIG. 19).

Since this holding rib 14a is integrated into the middle frame 3, a component dedicated to the purpose of pressing the holding plate 64 becomes unnecessary, and the component count may thus be reduced.

In addition, when the middle frame 3 and the rear panel 5 are joined, since the holding plate 64 is held by the holding rib 14a at the same time, no work is required specifically for pressing the holding plate 64 with the holding rib 14a, and an improvement in efficiency may be expected.

Below, a description will be given with respect to the above-mentioned battery loading section 17 provided inside the outer casing 2, and a battery 200 that is loaded into the battery loading section 17 (see FIG. 20 through FIG. 36).

As described above, the battery loading section 17 includes the right side surface section 10, the restrictive wall section 15, the reinforcement section 14 and the holding wall section 16, all of which belong to the middle frame 3. The internal space of the battery loading section 17 is taken to be the insertion space 17a into which the battery 200 is inserted (see FIG. 20).

Since the battery loading section 17 is thus provided through the right side surface section 10, the restrictive wall section 15, the reinforcement section 14 and the holding wall section 16 which are integrated into the middle frame 3, the component count can be reduced, and a reduction in the manufacturing costs of the electronic apparatus 1 may be expected.

Figure 21:
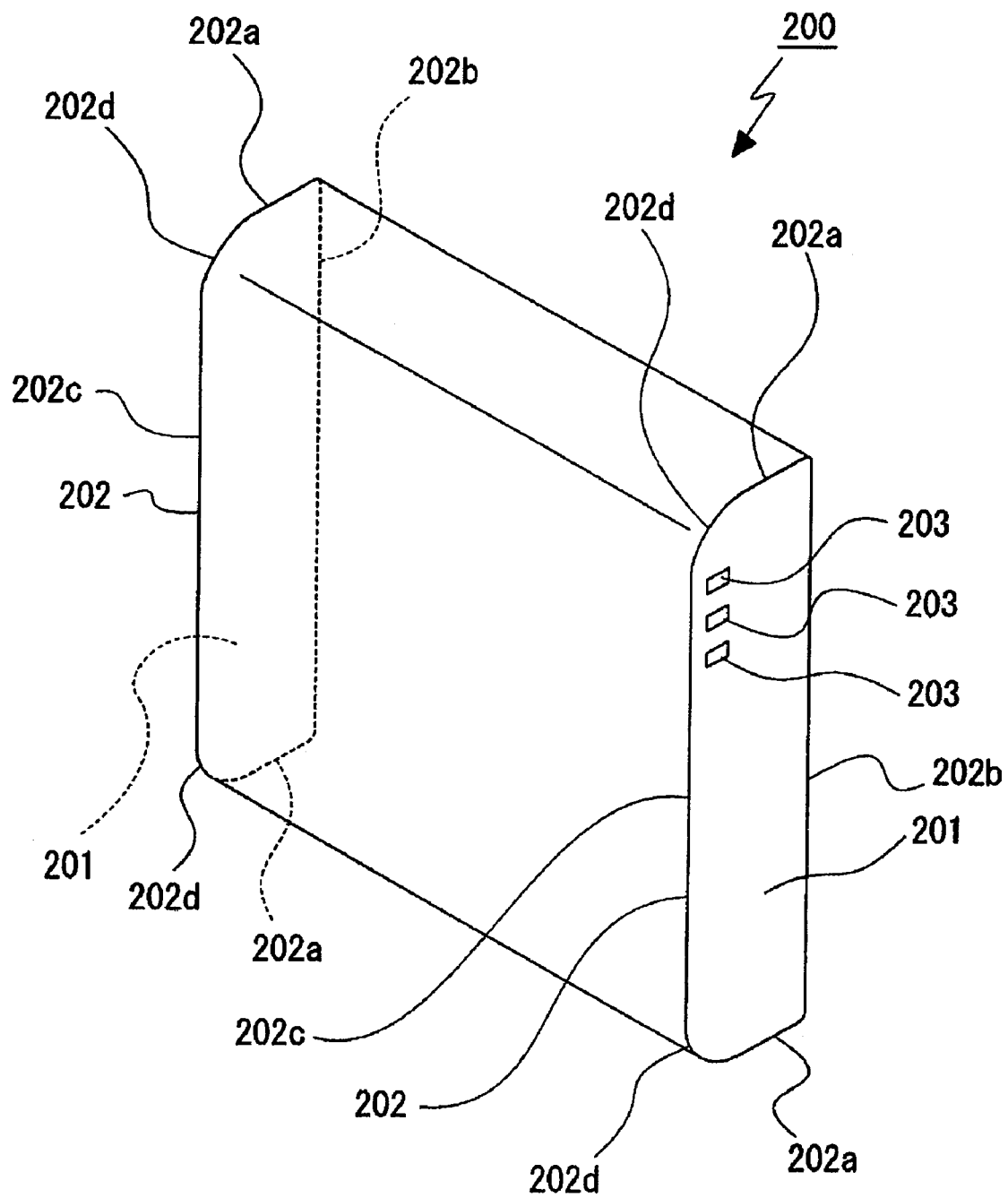
FIG. 21 is an enlarged perspective view of the battery.

The battery 200 is formed approximately in the shape of an elliptical cylinder cut in half along its wider diameter (see FIG. 21). Outer perimeters 202, 202 of end surfaces 201, 201, which face the insertion direction and ejection direction with respect to the insertion space 17a, respectively, of the battery 200 include six portions. In other words, the outer perimeter 202 includes first linear sections 202a, 202a of equal length, a second linear section 202b that is orthogonal to the first linear sections 202a, 202a, a third linear section 202c, and two curve sections 202d, 202d that form an approximately circular arc whose center angle is approximately 90 degrees.

The end surface 201 of the battery 200 facing the insertion direction is provided with connective terminals 203, 203, 203. The connective terminals 203, 203, 203 are positioned near the third linear section 202c in such a manner that they align with the third linear section 202c.

The third linear section 202c is shorter than the second linear section 202b, and one end of each of the first linear sections 202a, 202a and both ends of the third linear section 202c are continuous with the curve sections 202d, 202d, respectively.

Figure 22:
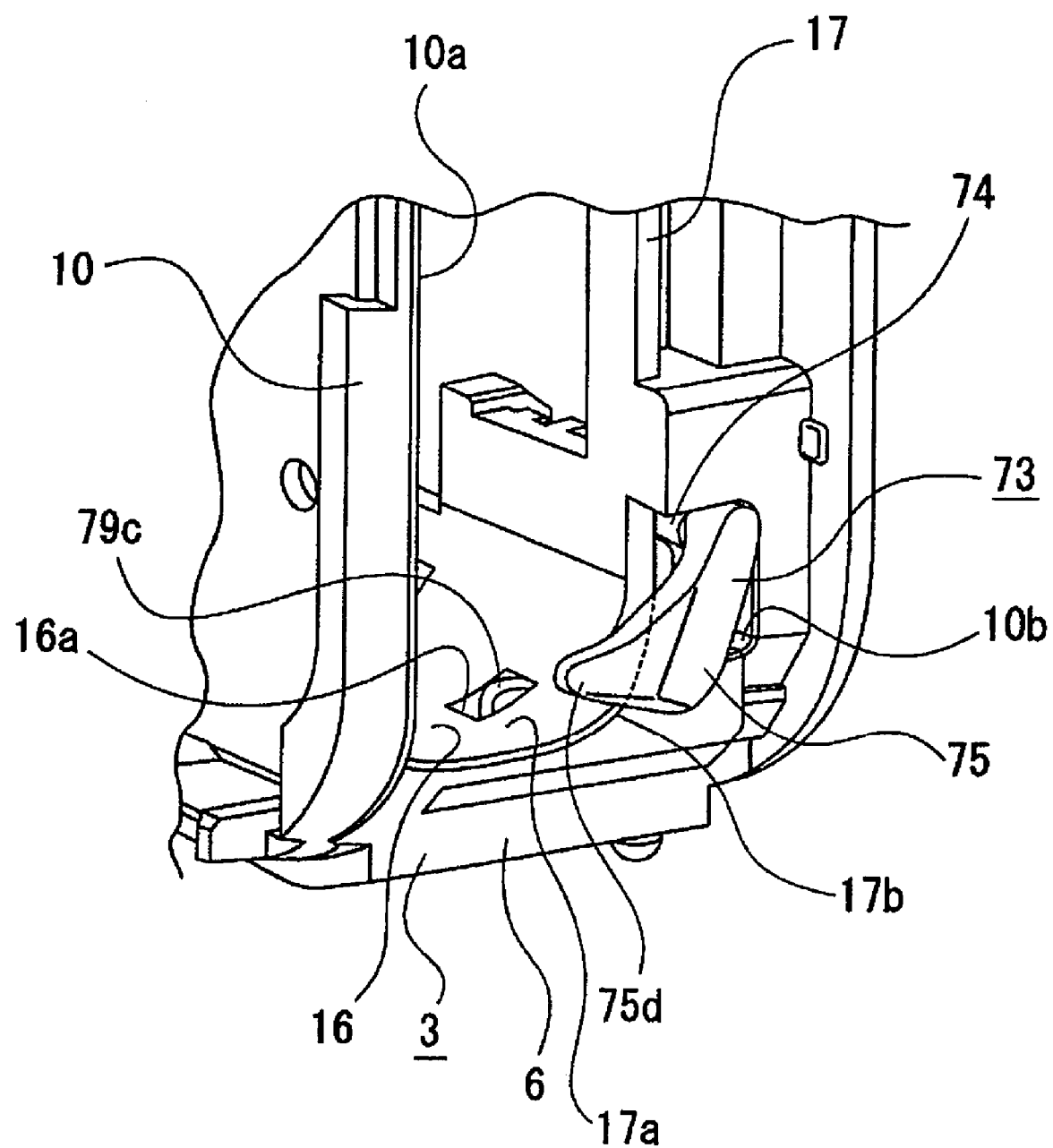
FIG. 22 is an enlarged perspective view indicating the battery loading section and a lock member.

The insertion space 17a of the battery loading section 17 is formed in a shape that accommodates the battery 200, and there are formed at the opening of the insertion space 17a circular arc rims 17b, 17b formed in the shape of circular arcs that accommodate the curve sections 202d, 202d of the battery 200, respectively (see FIG. 22).

Towards the right end of the holding wall section 16, there is formed an insertion hole 16a that is continuous with the insertion space 17a (see FIG. 22). Towards the right end of the front surface of the holding wall section 16, there are provided bearing sections 16b, 16b which are spaced apart in the horizontal direction (see FIG. 23).

Figure 23:
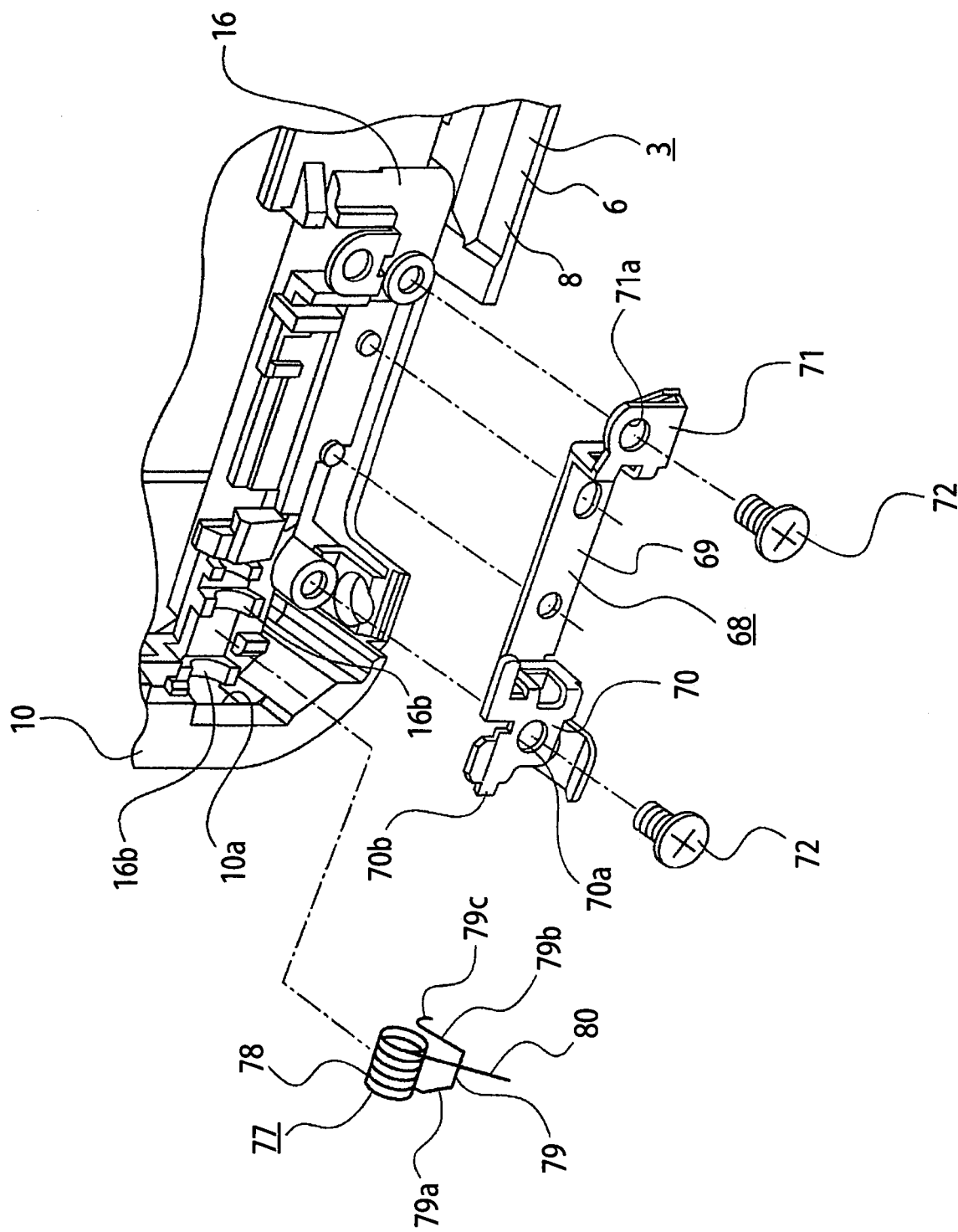
FIG. 23 is an enlarged exploded perspective view indicating a portion of the middle frame, a supporting member and a spring member.

A supporting member 68 is attached to the front surface of the holding wall section 16 (see FIG. 23)

The supporting member 68 includes a middle section 69 that extends in the horizontal direction, and attachment sections 70, 71 that are provided continuously with the left and right sides of the middle section 69, respectively. Screw insertion holes 70a, 71a are formed in the attachment sections 70, 71, respectively. A spring supporting piece 70b that protrudes upward is provided on the attachment section 70.

The supporting member 68 is attached to the holding wall section 16 by having attachment screws 72, 72, which penetrate the screw insertion holes 70a, 71a of the attachment sections 70, 71, respectively, screwed into the holding wall section 16.

Figure 24:
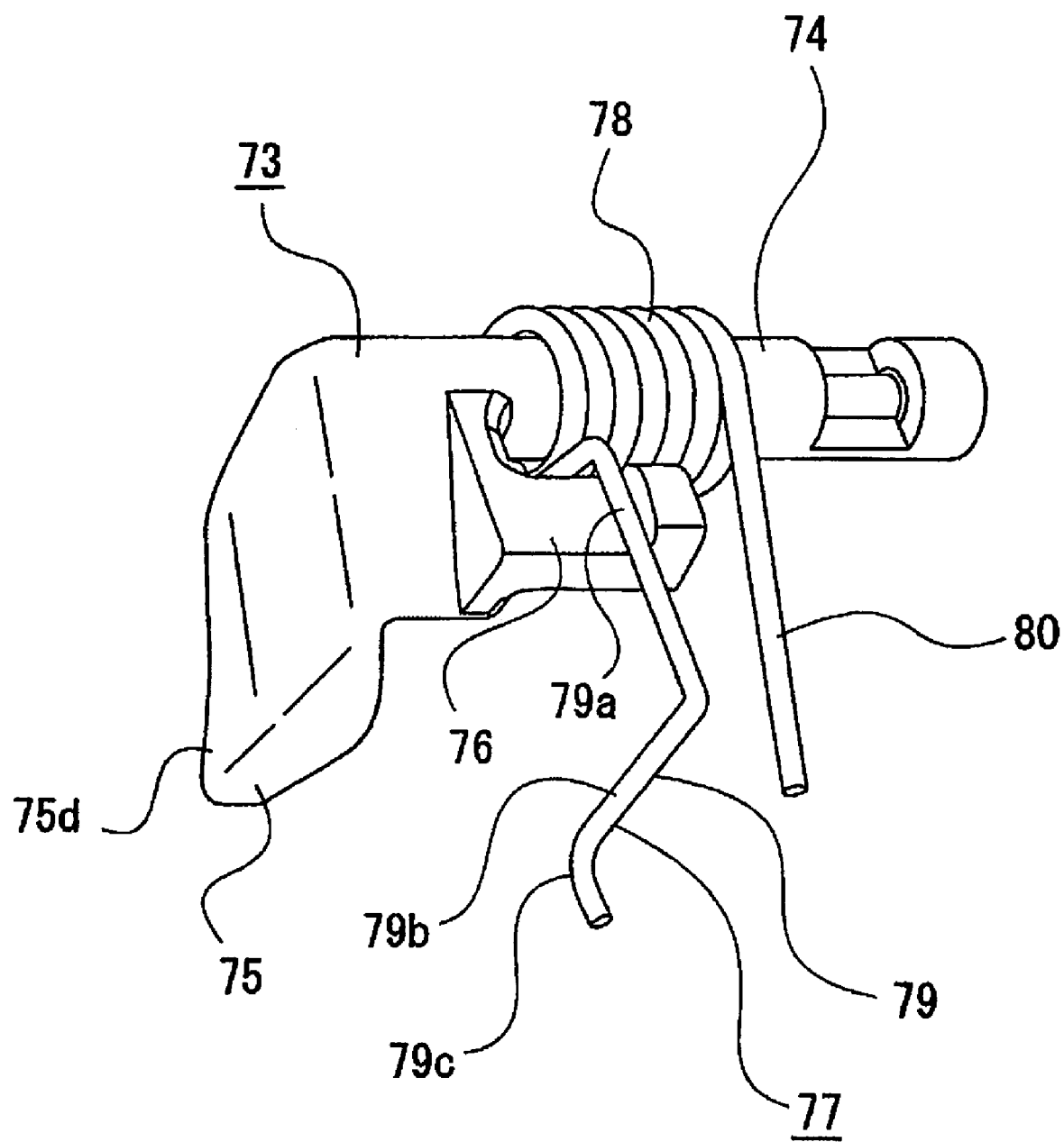
FIG. 24 is an enlarged perspective view indicating the lock member and the spring member.

A lock member 73 that functions as lock means is supported rotatably on the bearing sections 16b, 16b of the holding wall section 16. As shown in FIG. 24, the lock member 73 includes a spindle section 74 that extends in the horizontal direction, a lock section 75 provided on the right end section of the spindle section 74, and a spring hooking protrusion section 76 that protrudes from a portion of the spindle section 74 towards the right end, all of which are integrated into one.

Figure 25:
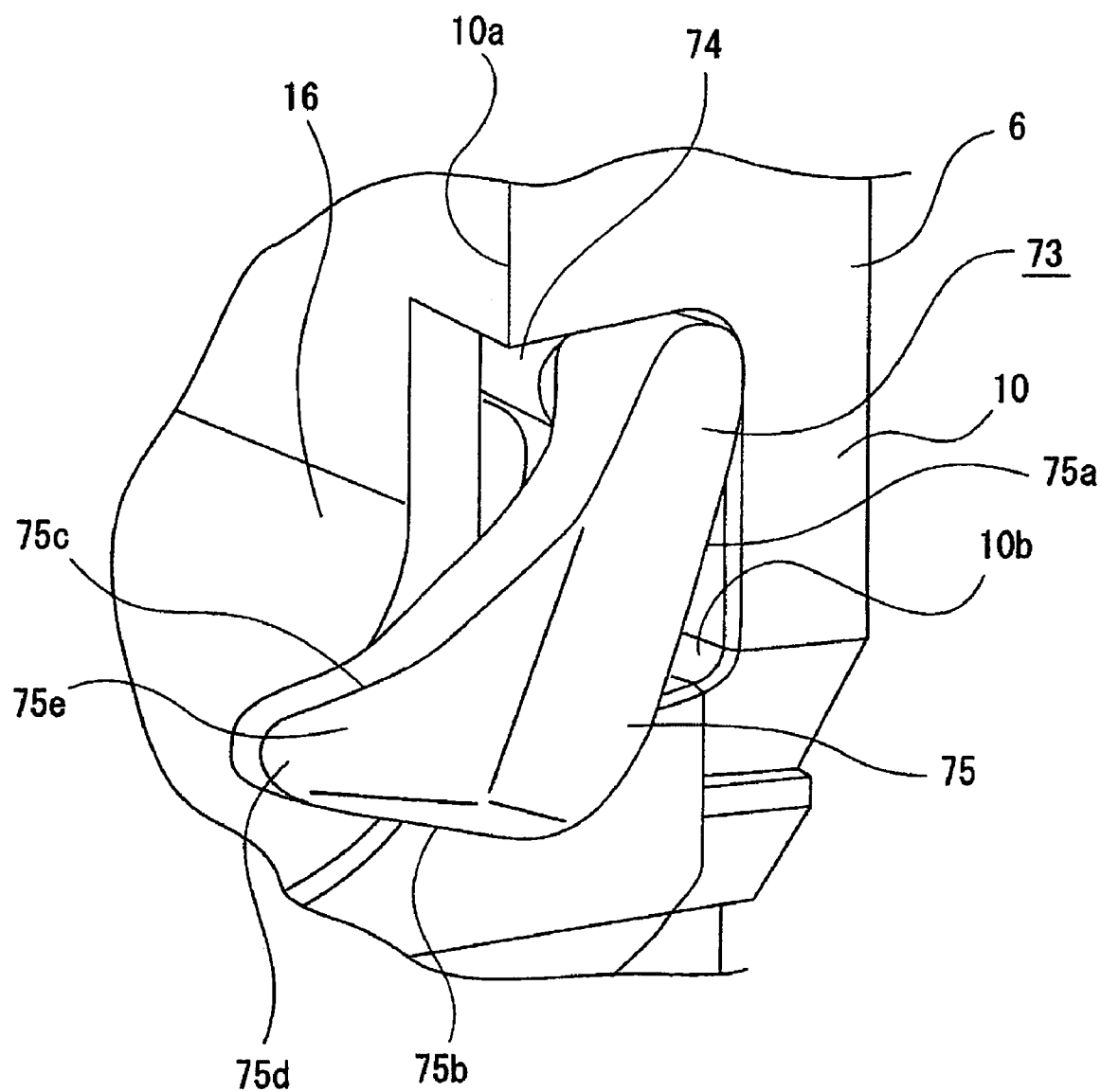
FIG. 25 is an enlarged perspective view indicating the form of a lock section of the lock member.
Figure 26:
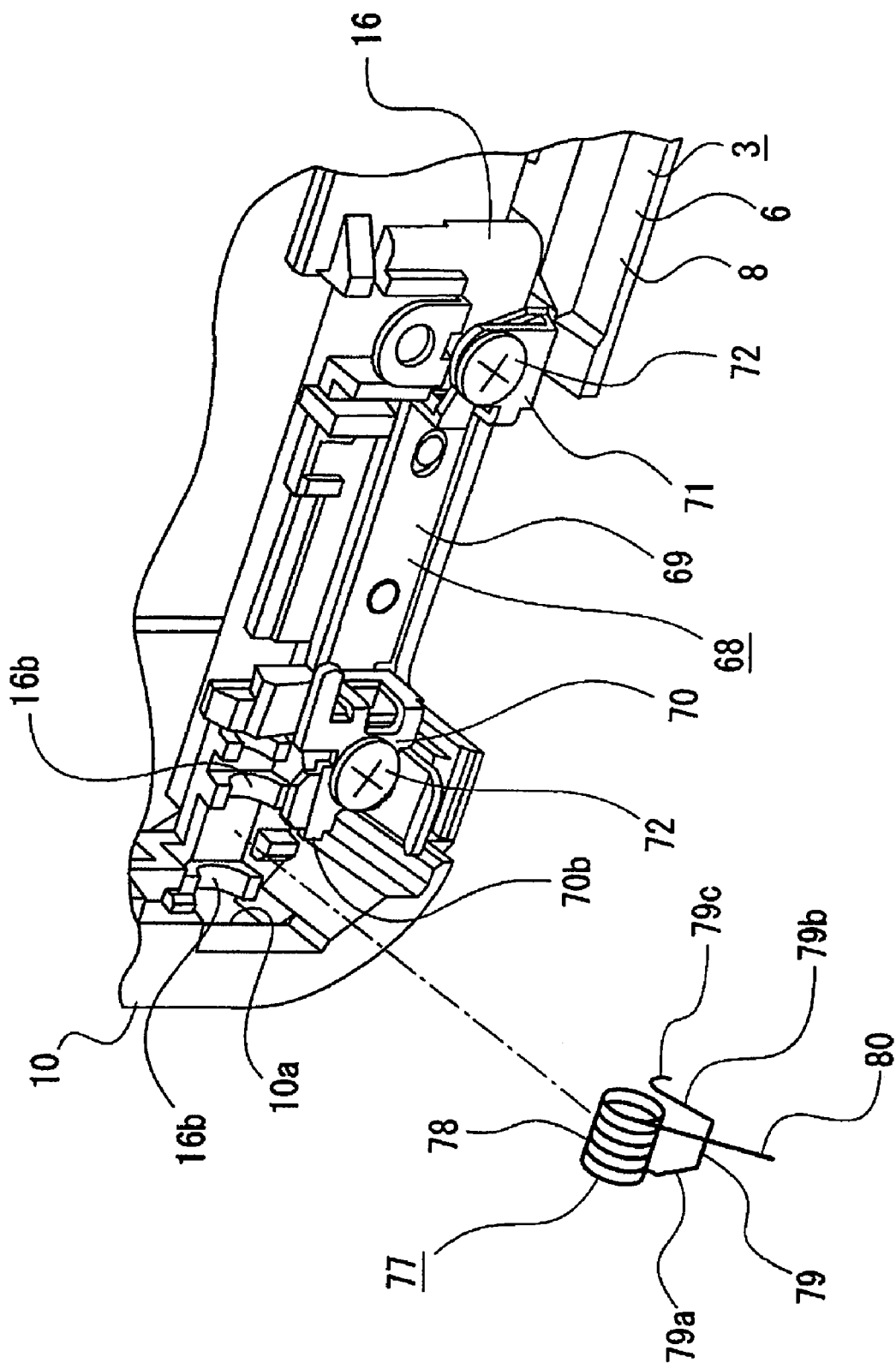
FIG. 26 is an enlarged perspective view indicating a portion of the middle frame, the supporting member and the spring member in a state where the supporting member is attached to the middle frame.
Figure 27:
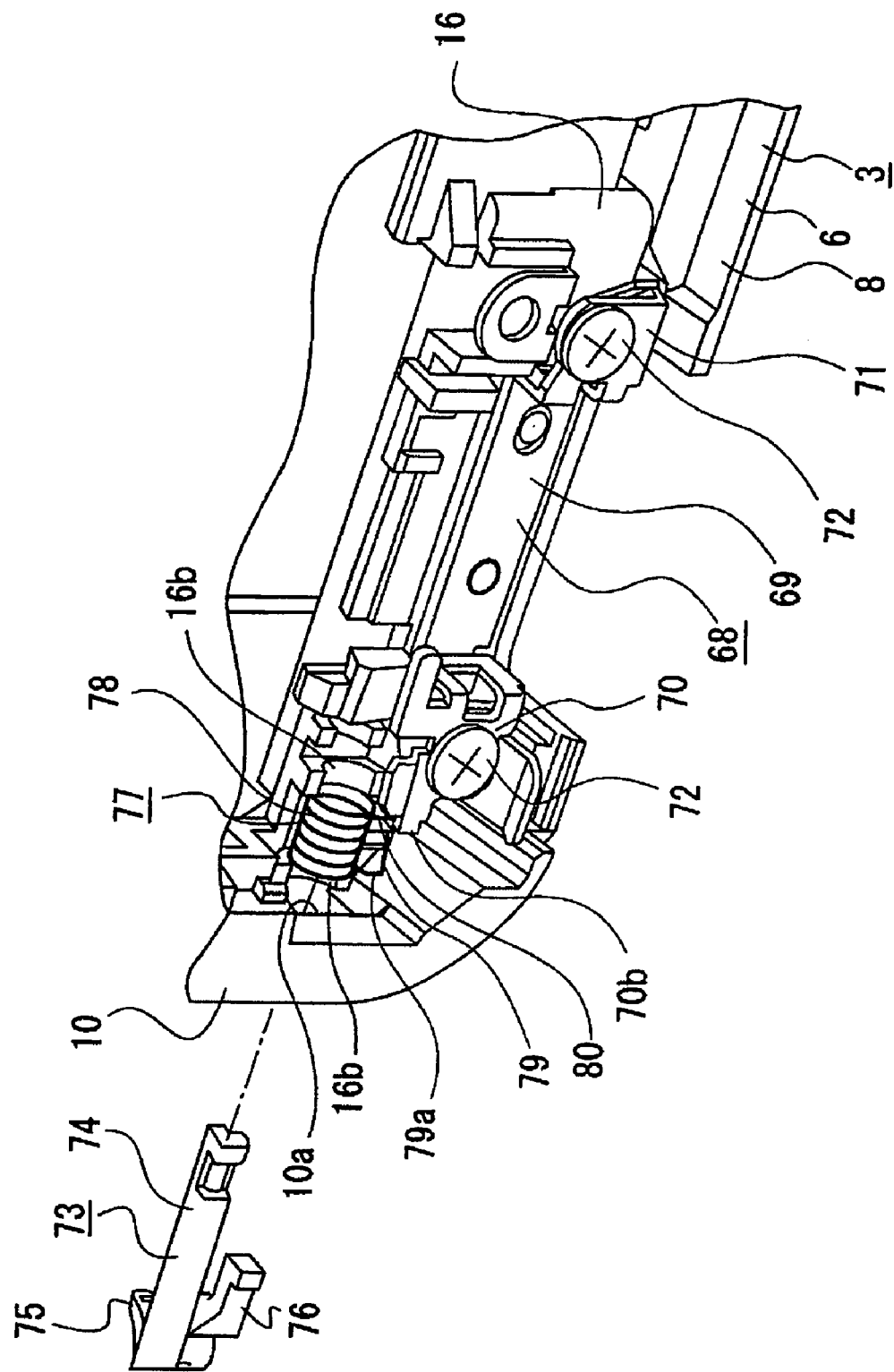
FIG. 27 is an enlarged perspective view indicating a portion of the middle frame, the supporting member, the spring member and the lock member with the lock member detached.

The lock section 75 protrudes from the spindle section 74 in a direction that is orthogonal to the shaft of the spindle section 74, and is formed to resemble a right-angled triangle (see FIG. 25). The lock section 75 includes two linear sections 75a, 75b whose outer perimeters are approximately orthogonal to each other, and one curve section 75c. The curve section 75c is formed in the shape of a moderate arc that corresponds to the circular arc rim 17b of the insertion space 17a into which the battery 200 is inserted. One of the non-right-angles of the lock section 75 is continuous with the spindle section 74, and the other non-right-angle is provided as a tip section 75d. The surface of the lock section 75 is such that the portion on the side of the tip section 75d is formed as a slope section 75e, and the lock section 75 becomes thinner as it gets closer to the tip of the tip section 75d due to the slope section 75e.

A spring member 77 is supported by the spindle section 74 of the lock member 73 (see FIG. 23 and FIG. 24). The spring member 77 may be, for example, a torsion coil spring, and includes a coil section 78, and a first arm section 79 and a second arm section 80 that protrude from both ends of the coil section 78, respectively.

The first arm section 79 is bent to a predetermined form and includes a flexible contact section 79a, which is continuous with the coil section 78 and which is formed so as to be bent at an angle of approximately 90 degrees with respect to the tip section of the coil section 78, and a lateral pressure exerting section 79b, which is formed so as to be bent at an angle of approximately 90 degrees with respect to the flexible contact section 79a. The tip portion of the lateral pressure exerting section 79b is bent in the shape of an approximately circular arc and is made to be a pressure section 79c. When the battery 200 is loaded into the battery loading section 17, the lateral pressure exerting section 79b serves the role of pressurizing means that exerts lateral pressure on the battery 200.

The spindle section 74 of the lock member 73 is inserted into the coil section 78 of the spring member 77, and the spring member 77 is thus supported by the lock member 73.

Figure 20:
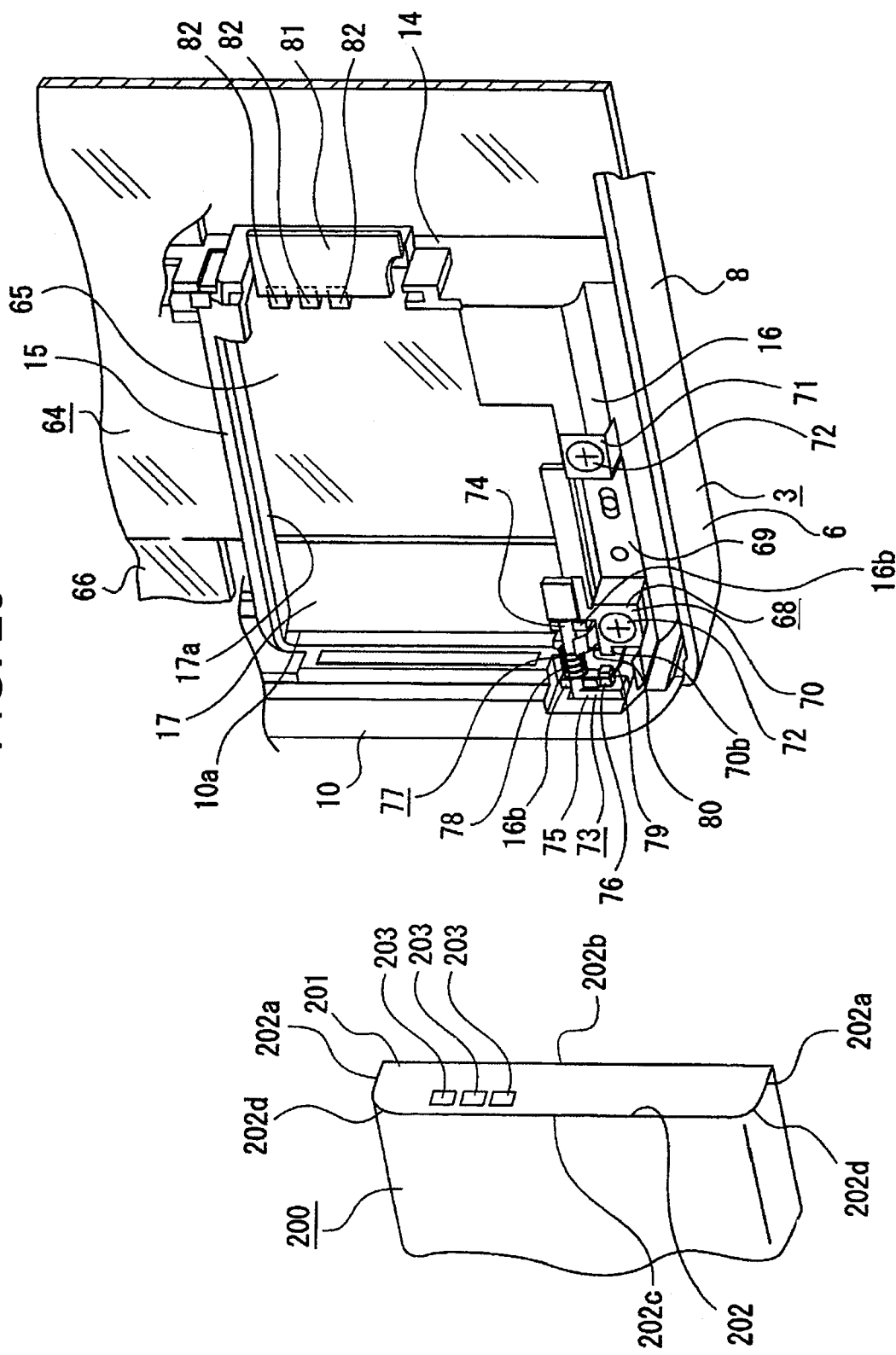
FIG. 20 is an enlarged perspective view indicating a battery loading section and a battery.

The spindle section 74 is inserted into the bearing sections 16b, 16b formed on the holding wall section 16, and the lock member 73 is thus rotatably supported by the middle frame 3 (see FIG. 20). When the lock member 73 is supported by the middle frame 3, the spindle section 74 and the spring hooking protrusion section 76 are aligned vertically, and the lock section 75 protrudes outward from the opening 10a formed in the right side surface section 10 of the middle frame 3 (see FIG. 22).

When the lock member 73 is supported by the middle frame 3, the spring member 77 supported by the lock member 73 is positioned between the bearing sections 16*b*, 16*b* of the holding wall section 16 (see FIG. 26 and FIG. 27), and as shown in FIG. 20 and FIG. 24, the flexible contact section 79*a* of the first arm section 79 elastically contacts the spring hooking protrusion section 76 of the lock member 73 from the front, and the tip section of the second arm section 80 elastically contacts, from behind, the spring supporting piece 70*b* of the supporting member 68 attached to the holding wall section 16. Thus, the lock member 73 is biased by the spring member 77, with the spindle section 74 as the fulcrum, in a direction of rotation that causes the spring hooking protrusion section 76 to move in approximately the forward direction, and the rotation of the lock member 73 is restricted by having the spring hooking protrusion section 76 be in contact with the holding wall section 16. At this point, the lock section 75 is in a state where its tip section 75*d* protrudes out from the circular arc rim 17*b* towards the insertion space 17*a* (see FIG. 22). In addition, the pressure section 79*c* of the lateral pressure exerting section 79*b* of the spring member 77 protrudes out to the insertion space 17*a* through the insertion hole 16*a* in the middle frame 3 (see FIG. 22).

A battery circuit board 81 is attached to the holding rib 14*a* of the reinforcement section 14 of the middle frame 3 (see FIG. 20). Terminal sections 82, 82, 82 are mounted on the battery circuit board 81. The terminal sections 82, 82, 82 are aligned vertically.

The operations of various parts when the battery 200 is inserted into or ejected from the insertion space 17*a* will be described below (see FIG. 28 through FIG. 31).

Figure 28:
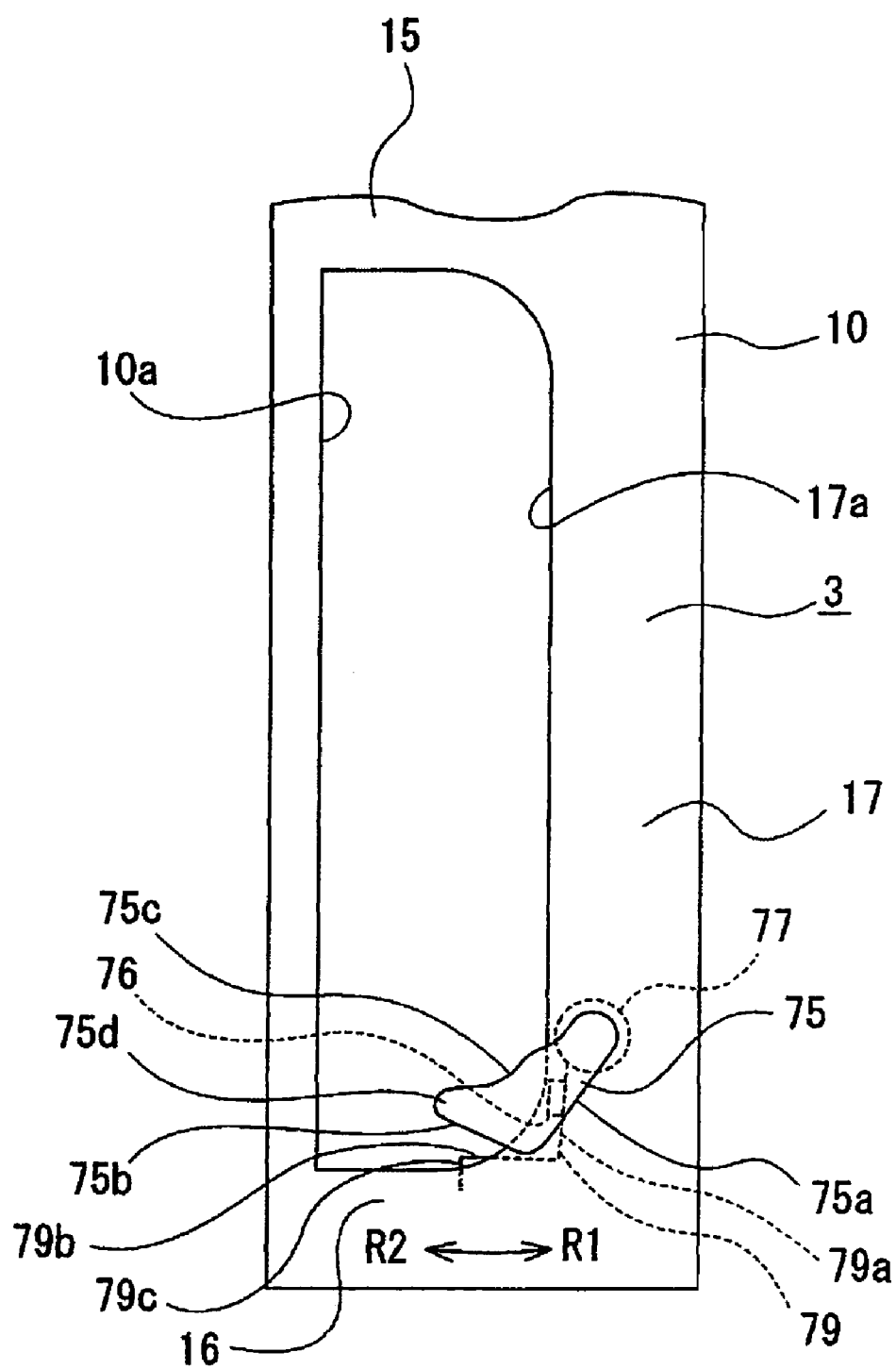
FIG. 28, together with FIG. 29 through FIG. 33, indicates each component in operation when the battery is loaded into the battery loading section, and is an enlarged side view indicating a state before the battery is inserted into an insertion space.

Before the battery 200 is inserted into the insertion space 17*a*, the lock member 73 is in a state where the tip section 75*d* of the lock section 75 protrudes from the circular arc rim 17*b* towards the insertion space 17*a* (see FIG. 28). At this point, with respect to the spring member 77, the pressure section 79*c* of the lateral pressure exerting section 79*b* protrudes out to the insertion space 17*a* through the insertion hole 16*a* in the middle frame 3.

In trying to insert the battery 200 into the insertion space 17*a*, first, the battery lid 13 is opened, the lock member 73 is rotated in direction R1 (see FIG. 28) against the bias of the spring member 77, and the entire insertion space 17*a* is thus opened. The rotating of the lock member 73 in direction R1 is performed manually by, for example, holding the lock section 75 of the lock member 73.

Figure 29:
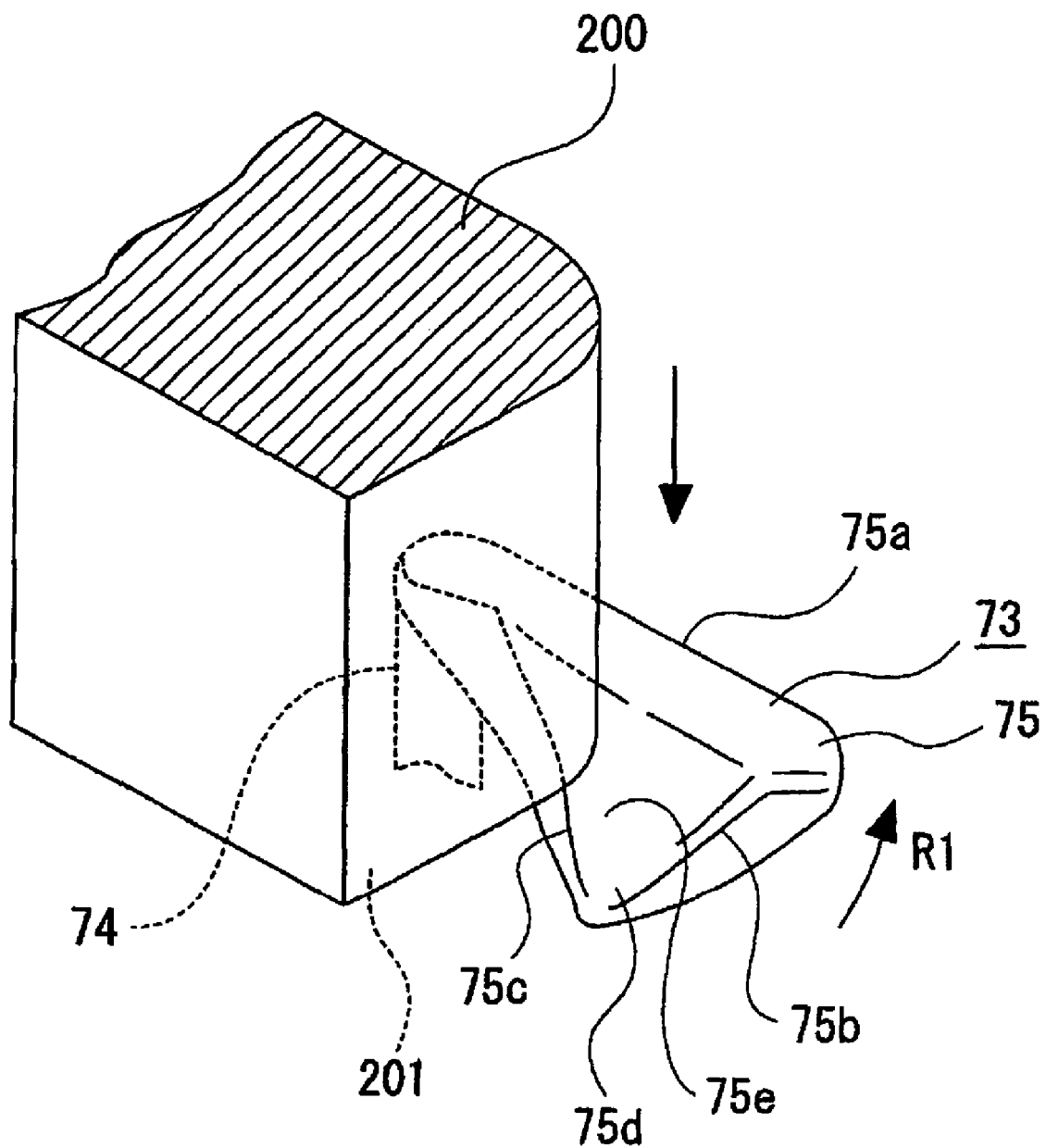
FIG. 29 is an enlarged perspective view indicating an operational state when the battery is held against a slope section of the lock section.
Figure 30:
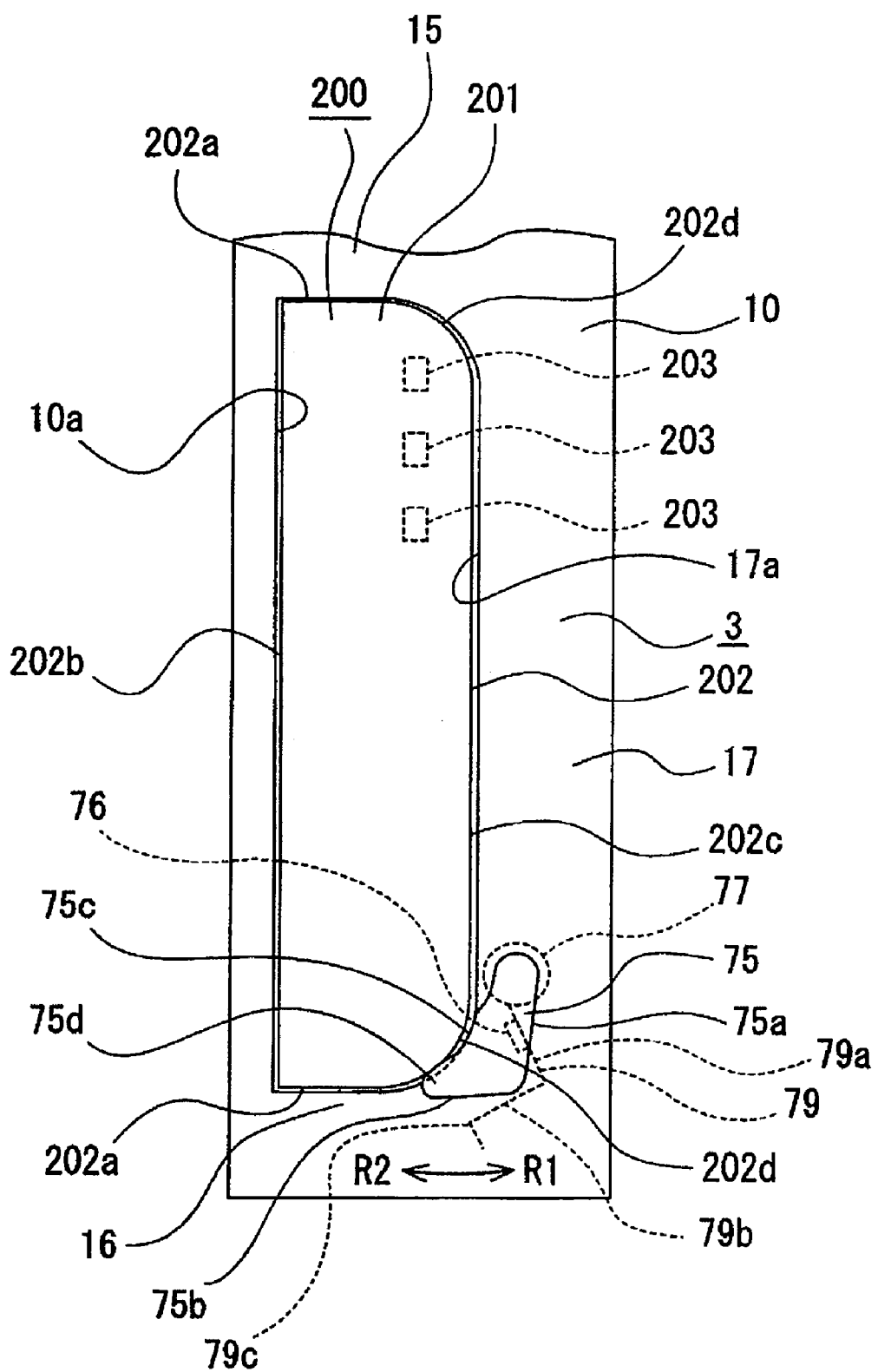
FIG. 30 is an enlarged side view indicating a state where the battery is in the middle of being inserted into the insertion space.

In addition, the rotating of the lock member 73 in direction R1 may also be carried out by pressing the battery 200 against the slope section 75*e* of the lock section 75 from above or diagonally from above (see FIG. 29). More specifically, when the battery 200 is pressed against the slope section 75*e* from above or diagonally from above, the battery 200 slides along the slope section 75*e*, thereby causing the lock section 75 to rotate in direction R1.

Thus, since the slope section 75*e* is formed on the lock section 75 of the lock member 73, the lock section 75 is made rotatable in direction R1 by pressing the battery 200 against the slope section 75*e* from above or diagonally from above, and the insertion of the battery 200 into the insertion space 17*a* can be carried out with ease.

When the lock member 73 is rotated in direction R1, the first arm section 79 of the spring member 77 that is in elastic contact with the spring hooking protrusion section 76 is caused to move approximately forward. Therefore, the pressure section 79*c* of the spring member 77 is drawn into the insertion hole 16*a* (see FIG. 30).

Figure 31:
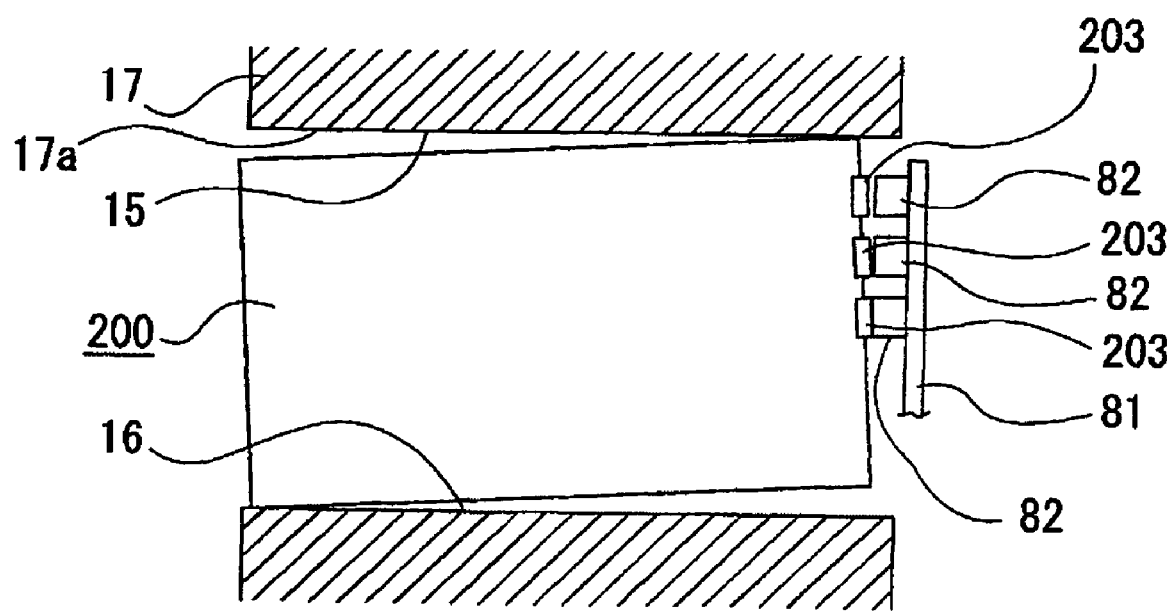
FIG. 31 is a schematic view indicating a state before the battery that is inserted into the insertion space is locked.

Since there exists a gap between the insertion space 17*a* and the battery 200 in order to secure good insertability/ejectability of the battery 200 with respect to the insertion space 17*a*, when the battery 200 is inserted into the insertion space 17*a*, there are cases where the battery 200 tilts in relation to the insertion space 17*a* to an extent corresponding to the size of the gap (see FIG. 31). If the battery 200 does tilt in relation to the insertion space 17*a*, there is a risk that contact failure would occur between the connective terminals 203, 203, 203 of the battery 200 and the terminal sections 82, 82, 82.

Figure 32:
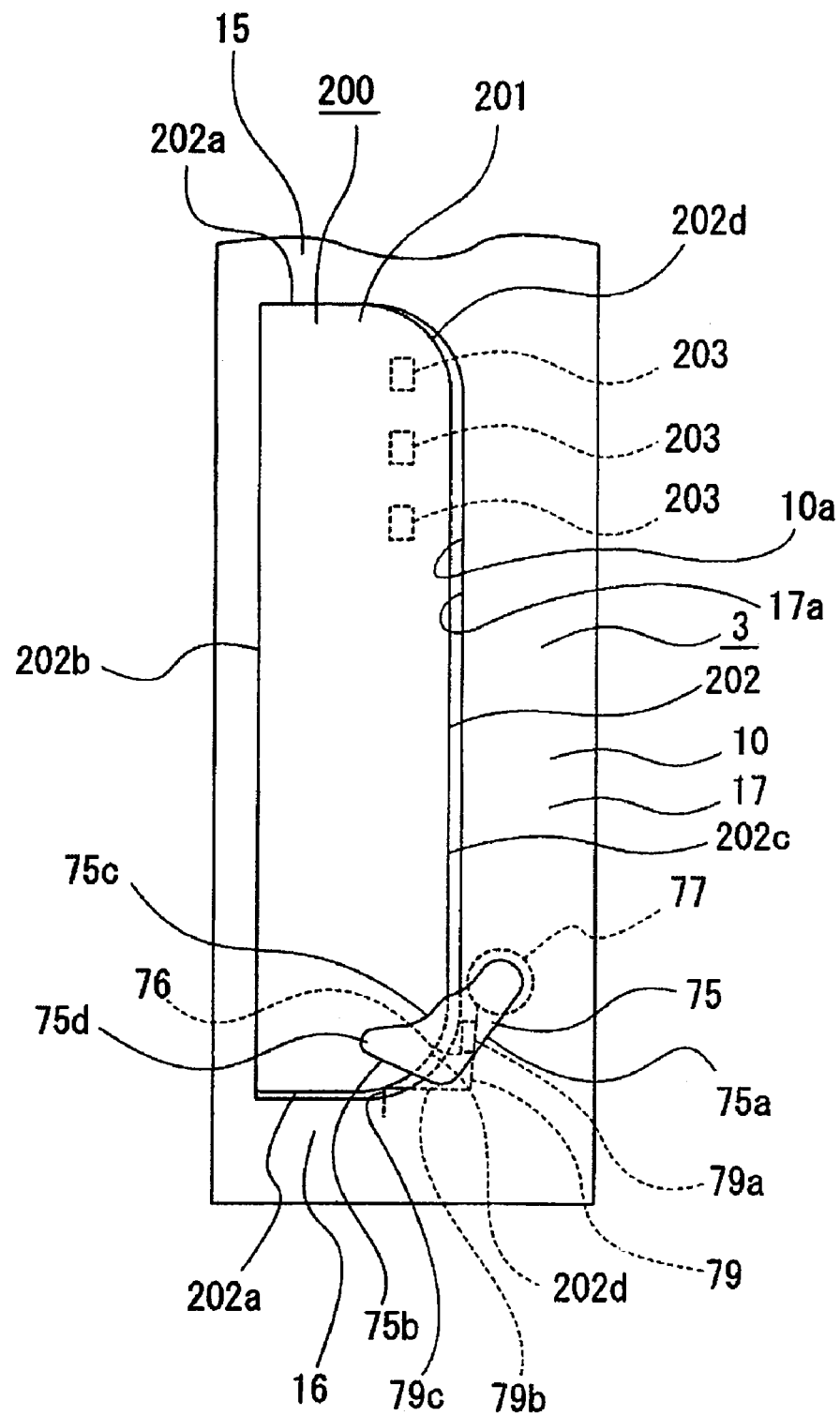
FIG. 32 is an enlarged side view indicating a state where the battery is inserted into the insertion space and locked.

However, when the battery 200 is inserted into the insertion space 17*a*, the lock member 73 is rotated in direction R2 (see FIG. 30) due to the bias of the spring member 77, and along with this rotating motion, the first arm section 79 is caused to move approximately backward, and the pressure section 79*c* protrudes out to the insertion space 17*a* through the insertion hole 16*a* (see FIG. 32).

Figure 33:
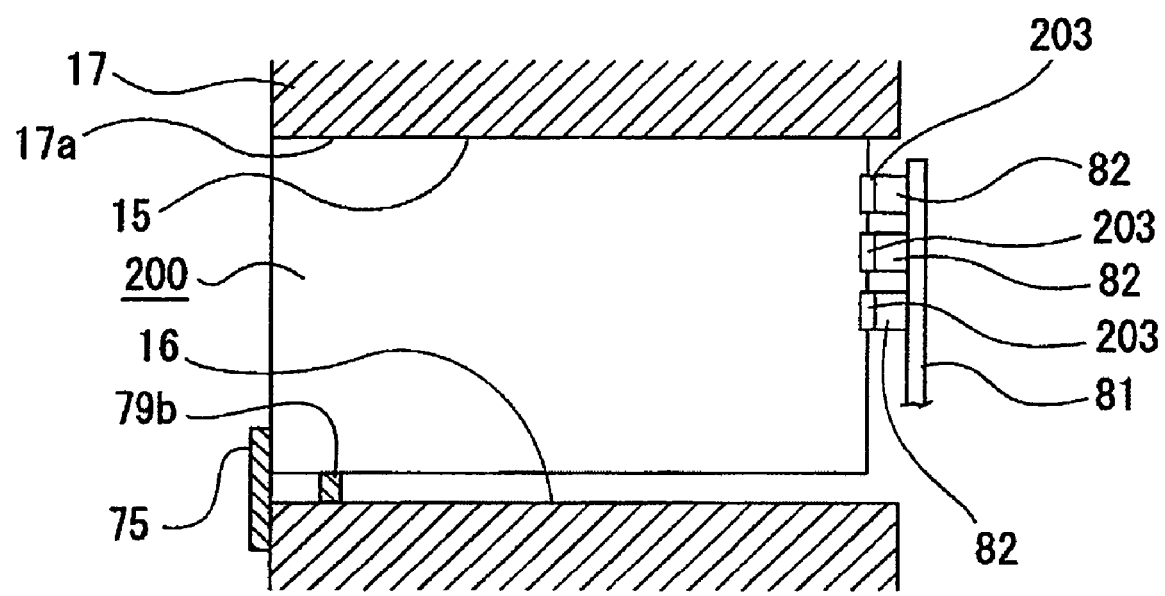
FIG. 33 is a schematic view indicating a state where the battery that is inserted into the insertion space is locked.

Through the rotation of the lock member 73 in direction R2, a portion of the lock member 75 comes into contact with one of the end surfaces 201 of the battery 200, and a state where the battery 200 is loaded into the battery loading section 17 is locked (see FIG. 32 and FIG. 33). In addition, when the pressure section 79*c* protrudes through the insertion hole 16*a* to the insertion space 17*a*, the battery 200 is pressed by the pressure section 79*c*, is held against the restrictive wall section 15, and the tilted state is corrected (see FIG. 32 and FIG. 33). Thus, the connective terminals 203, 203, 203 of the battery 200 and the terminal sections 82, 82, 82 are connected in a good condition.

Finally, by closing the battery lid 13, the insertion of the battery 200 is completed.

On the other hand, the ejection of the battery 200 from the battery loading section 17 is performed by first opening the battery lid 13, then undoing the lock on the battery 200 by rotating the lock member 73, and finally pulling the battery 200 out from the insertion space 17*a*.

As described above, in the electronic apparatus 1, the lateral pressure exerting section 79*b*, which functions as pressurizing means for exerting lateral pressure on the battery 200, of the spring member 77 and the lock member 73 that functions as lock means are linked, and when the battery 200 is locked by the lock member 73, lateral pressure is exerted on the battery 200 by the lateral pressure exerting section 79*b*, while the lateral pressure on the battery 200 exerted by the lateral pressure exerting section 79*b* is released when the locking of the battery 200 by the lock member 73 is released.

Therefore, when the battery 200 is loaded into the battery loading section 17 and locked, the battery 200 is pressed against the restrictive wall section 15 by the lateral pressure exerting section 79*b*, and it is thus possible to maintain a good connective state between the connective terminals 203, 203, 203 and the terminal sections 82, 82, 82. In addition, since the exertion of lateral pressure by the lateral pressure exerting section 79*b* is released when the lock on the battery 200 is released, it is possible to insert or take out the battery 200 into or from the insertion space 17*a* smoothly.

It is noted that since the lateral pressure on the battery 200 is exerted by the pressure section 79*c* of the spring member 77 and not by the lock member 73, it is possible to form the lock means and pressurizing means in their ideal shapes that suit there respective functions, thereby enabling an improvement in the flexibility of design and an efficient placement of the components.

In addition, although in the description above, an example is given where the lock means and the pressurizing means are linked by having the spring member 77 supported by the lock member 73, it is also possible to link the lock means and the pressurizing means using some appropriate link means.

In addition, since the lock member 73 is rotated with the spindle section 74 as the fulcrum, and the lateral pressure exerting section 79b also moves in the same rotational direction along with the rotational motion of the lock member 73, it is possible to secure operational reliability, the operational space for the lock member 73 and the lateral pressure exerting section 79b can be kept small, and miniaturization of the electronic apparatus 1 can be achieved.

Further, since the lateral pressure exerting section 79b that functions as the pressurizing means is part of the spring member 77, the dimensional tolerance between the members when the battery 200 is pressed against the restrictive wall section 15 is absorbed, and it is thus possible to have the battery 200 pressed against the restrictive wall section 15 with an appropriate force.

In addition, since the battery 200 is locked in the battery loading section 17 by forming the lock section 75 in such a shape that it becomes wider the further it is from the spindle section 74 by forming the curve section 75c on the lock section 75 of the lock member 73, and by having the lock section 75 contact the end surface 201 of the battery 200 on the side that is inserted, the contact area of the lock member 75 with respect to the end surface 201 is large, and a locked state for the battery 200 can be stabilized.

Figure 34:
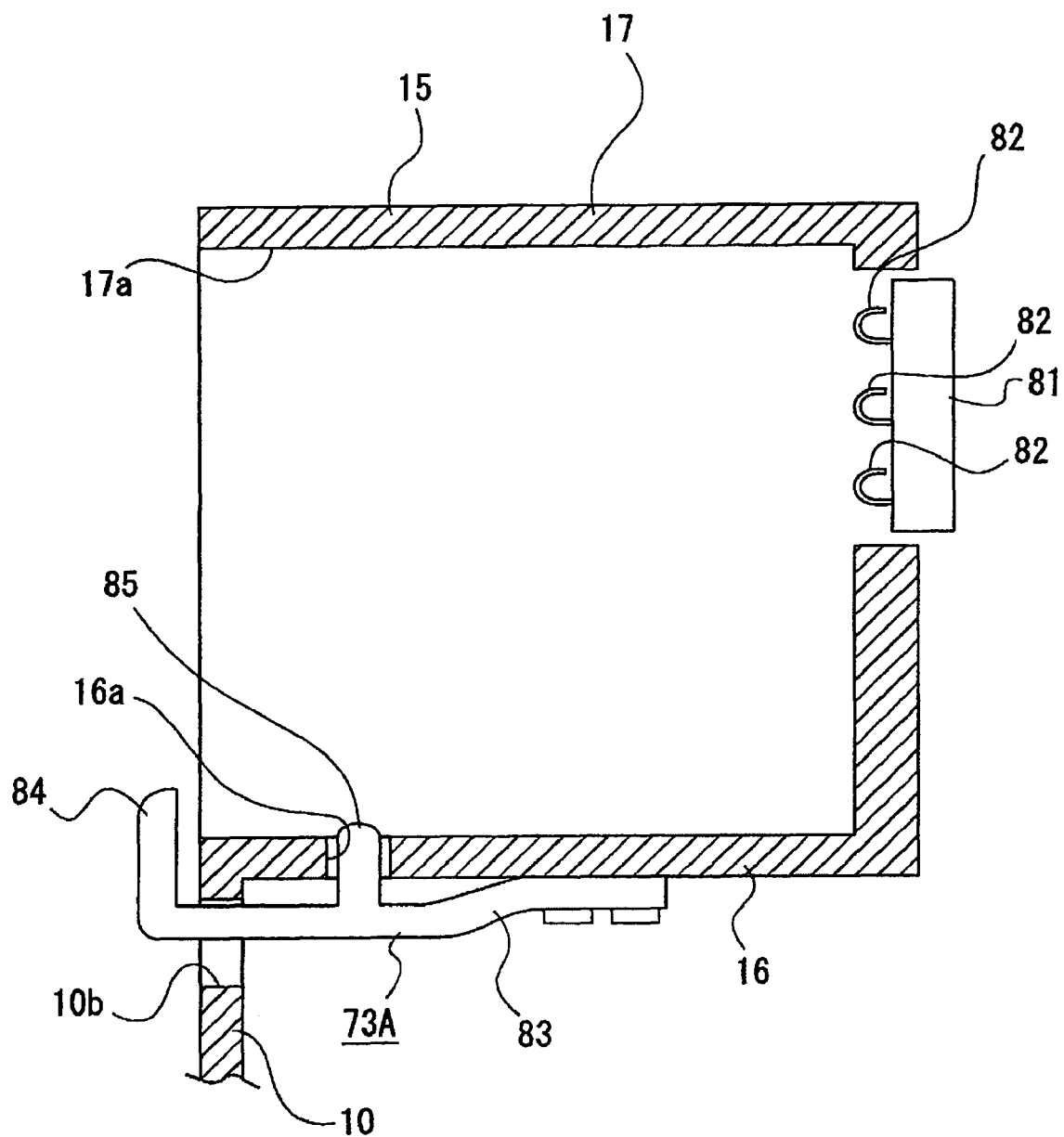
FIG. 34, together with FIG. 35 and FIG. 36, indicates each component in operation when the battery is loaded into the battery loading section in a case where a different lock member is used, and is an enlarged sectional view indicating a state before the battery is inserted into the insertion space.
Figure 35:
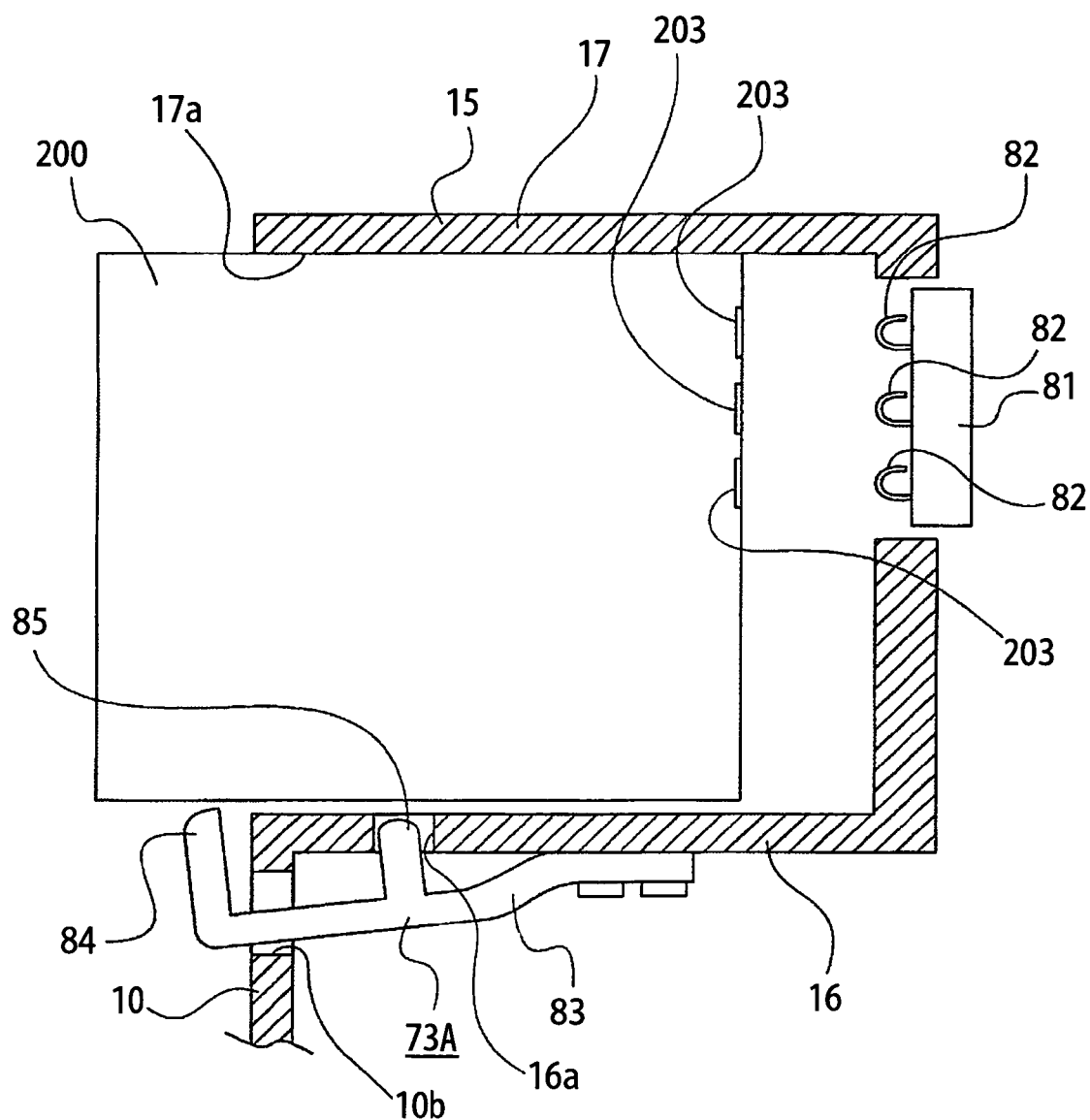
FIG. 35 is an enlarged sectional view indicating a state where the battery is in the middle of being inserted into the insertion space.
Figure 36:
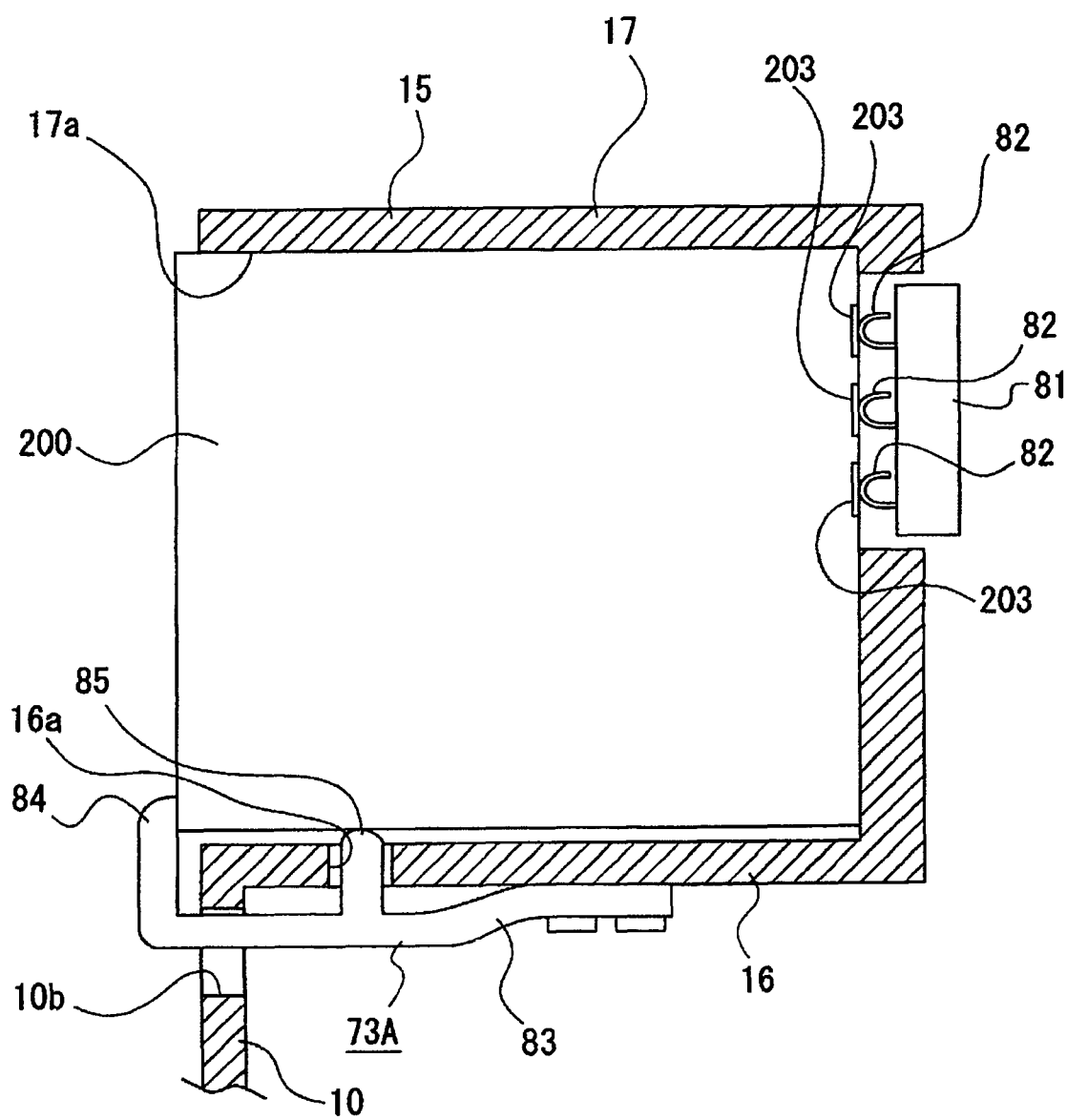
FIG. 36 is an enlarged sectional view indicating a state where the battery is inserted into the insertion space and locked.
Figure 37:
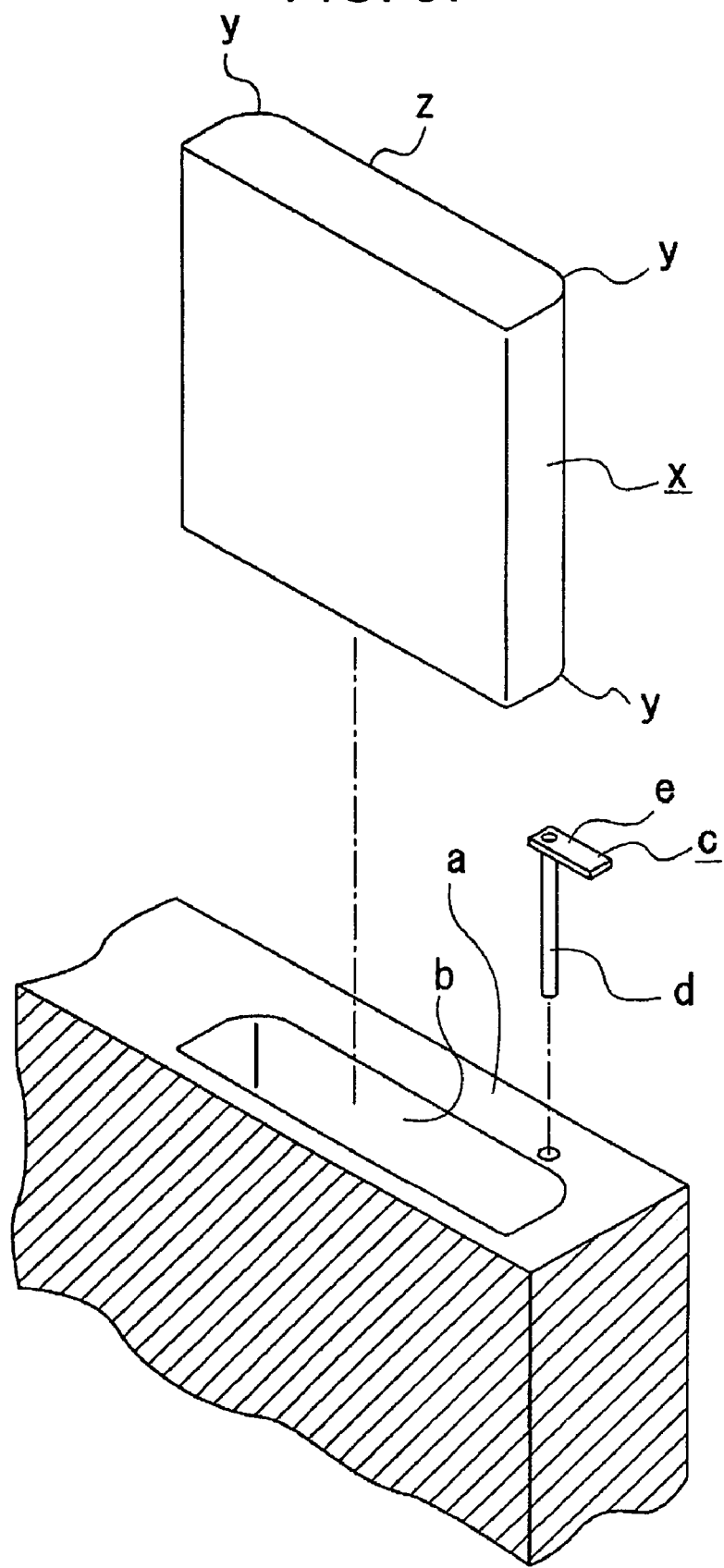
FIG. 37, together with FIG. 38, illustrates how issues are addressed, and is an exploded perspective view.
Figure 38:
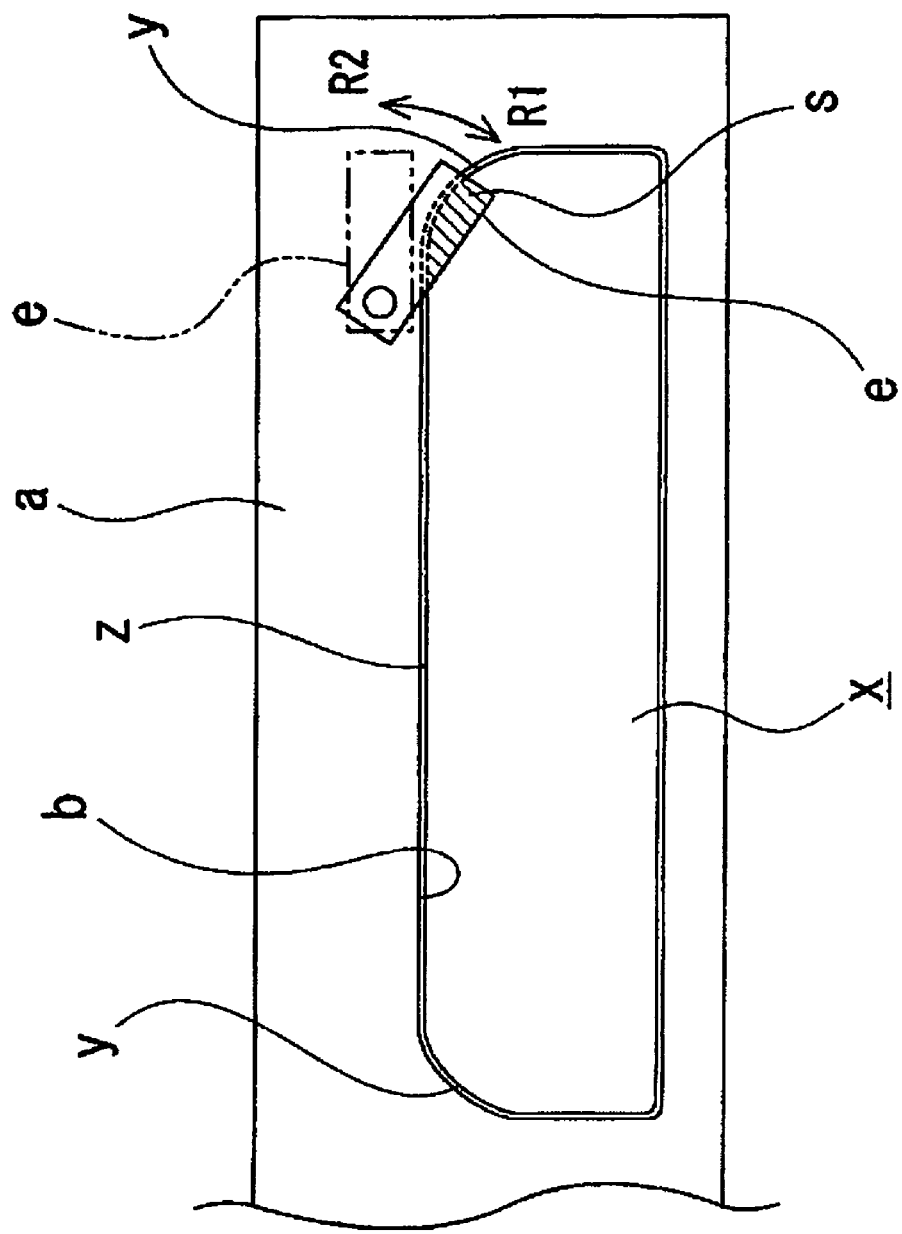
FIG. 38 is a side view thereof.

It is noted that although in the description above, an example is given of a lock member 73 that locks that battery 200 by rotating, it is also possible to use, instead of the lock member 73, a lock member 73A that performs locking through elastic deformation (see FIG. 34 through FIG. 36).

The lock member 73A is formed using a material having a large capacity for elastic deformation, such as a resin material, and as shown in FIG. 34, includes a base section 83 that extends in the horizontal direction, a lock section 84 that protrudes orthogonally from one end section, in its longitudinal direction, of the base section 83, and a lateral pressure exerting section 85 that protrudes orthogonally from a middle section, in its longitudinal direction, of the base section 83.

The other end section of the base section 83 of the lock member 73A is attached to the holding wall section 16. The lock section 84 protrudes from the placement hole 10b in the right side surface section 10 and a portion of the lock member 84 is positioned towards the side of the insertion space 17a. A tip section of the lateral pressure exerting section 85 protrudes out to the insertion space 17a through the insertion hole 16a in the holding wall section 16.

When inserting the battery 200 into the insertion space 17a, the lock member 73a is bent in order to open the whole of the insertion space 17a (see FIG. 35). By bending the lock member 73A, the lateral pressure exerting section 85 is drawn into the insertion hole 16a. Therefore, it is possible to smoothly insert the battery 200 into the insertion space 17a.

When the lock member 73A is returned to its original state once the battery 200 is inserted into the insertion space 17a, the battery 200 is locked by the lock section 84, and lateral pressure is exerted on the battery 200 by the lateral pressure exerting section 85, thereby pressing the battery 200 against the restrictive wall section 15. By having the battery 200 pressed against the restrictive wall section 15, the battery 200 is prevented from tilting within the insertion space 17a, and the connective terminals 203, 203, 203 and the terminal sections 82, 82, 82 are securely connected.

Ejection of the battery 200 from the insertion space 17a is performed in a state where the whole of the insertion space 17a is opened by bending the lock member 73A again, and where the exertion of the lateral pressure on the battery 200 by the lateral pressure exerting section 85 is released.

Since the lock member 73A has the lock section 84 and the lateral pressure exerting section 85 integrated into one as described above, it is possible to reduce the component count.

The present invention contains subject mater related to Japanese Patent Application No. JP2005-247961 filed in the Japanese Patent Office on Aug. 29, 2005, the entire contents of which being incorporated herein by reference.

The specific forms and structures of the various components described above are merely examples of embodiments in implementing the present invention, and the technical scope of the present invention should by no means be restricted by these examples.

What is claimed is:

1. A battery loading mechanism, comprising:
   a battery loading section having an insertion space capable for accommodating a battery, in which a portion of an outer circumference of each of two end surfaces on insertion and ejection sides, respectively, is formed as a curve section; and
   lock means for locking the battery loaded into the battery loading section, the lock means rotatably supported on the battery loading section;
   wherein the lock means includes
      a lock section, the lock section being formed in such a shape that it becomes wider the further away it is from a point at which the lock means is rotatably supported, and
      a spindle section extending in a direction in which the battery is inserted into the battery loading section, the lock section being connected to the spindle section to rotate about an axis of the spindle section, and
   wherein at least a portion of a side edge of the lock section in a width direction is formed as a curve section corresponding to the curve section of the battery.

2. The battery loading mechanism according to claim 1, wherein:
   an opening rim of the insertion space of the battery loading section on the entrance side is formed in a shape that accommodates the end surfaces of the battery on the insertion and ejection sides;
   in inserting the battery into the insertion space, the curve section of the side edge of the lock section is positioned to be in alignment with a portion of the opening rim of the battery loading section that is formed in a curve; and
   the lock section rotates and contacts the end surface of the battery on the ejection side to lock the battery in the battery loading section, thereby completing the insertion of the battery into the battery loading section.

3. The battery loading mechanism according to claim 2, wherein:
   the spindle section serves as a fulcrum; and
   the lock section protrudes from the spindle section, and rotating in a direction in which a shaft of the spindle section rotates.

4. The battery loading mechanism according to claim 1, further comprising:
   a slope section, which is formed on a surface of the lock section and which becomes thinner the closer it gets to the curve section of the lock section.

5. An electronic apparatus which accommodates a battery having a portion of an outer circumference of each of two end surfaces on insertion and ejection sides, respectively, formed as a curve section, the apparatus comprising:
   a battery loading section having an insertion space capable for accommodating a battery, in which a portion of an outer circumference of each of two end surfaces on insertion and ejection sides, respectively, is formed as a curve section; and lock means for locking the battery loaded into the battery loading section, the lock means rotatably supported on the battery loading section;

wherein the lock means includes a lock section, the lock section being formed in such a shape that it becomes wider the further away it is from a point at which the lock means is rotatably supported, and a spindle section extending in a direction in which the battery is inserted into the battery loading section, the lock section being connected to the spindle section to rotate about an axis of the spindle section, and wherein at least a portion of a side edge of the lock section in a width direction is formed as a curve section corresponding to the curve section of the battery.

6. The battery loading mechanism according to claim 5, wherein:

an opening rim of the insertion space of the battery loading section on the entrance side is formed in a shape that accommodates the end surfaces of the battery on the insertion and ejection sides;

in inserting the battery into the insertion space, the curve section of the side edge of the lock section is positioned to be in alignment with a portion of the opening rim of the battery loading section that is formed in a curve; and the lock section rotates and contacts the end surface of the battery on the ejection side to lock the battery in the battery loading section, thereby completing the insertion of the battery into the battery loading section.

7. The battery loading mechanism according to claim 6, wherein:

the spindle section serves as a fulcrum; and the lock section protrudes from the spindle section, and rotating in a direction in which a shaft of the spindle section rotates.

8. The battery loading mechanism according to claim 5, further comprising:

a slope section, which is formed on a surface of the lock section and which becomes thinner the closer it gets to the curve section of the lock section.

9. The battery loading mechanism according to claim 1, wherein the lock means include at least one protrusion configured to engage a side of the battery when the battery is loaded into the battery loading section, the engagement orienting the battery with respect to terminal sections located within the insertion space.

10. The battery loading mechanism according to claim 9, wherein the at least one protrusion includes two protrusions configured to engage two different sides of the battery.

11. The battery loading mechanism according to claim 10, wherein at least one of the two protrusions includes an arm section of a resilient member configured to bias the lock means toward a locked position.

12. The battery loading mechanism according to claim 11, wherein another of the two protrusions includes a protrusion extending from a spindle of the lock means.

13. The battery loading mechanism of claim 1, further including a lid configured to cover the lock means and an end of the battery.

14. A battery loading mechanism, comprising:

a battery loading section having an insertion space configured to accommodate a battery; and lock means for locking the battery loaded into the battery loading section;

wherein the lock means includes:

a spindle section extending in a direction in which the battery is inserted into the battery loading section; and a lock section connected to the spindle section to rotate about an axis of the spindle section from an unlocked position to a locked position at which the battery is constrained from movement in at least two directions by the lock section.

15. The battery loading mechanism according to claim 14, further including a lid for closing off the insertion space.

* * * * *